US006950948B2

(12) United States Patent
Neff

(10) Patent No.: US 6,950,948 B2
(45) Date of Patent: Sep. 27, 2005

(54) VERIFIABLE, SECRET SHUFFLES OF ENCRYPTED DATA, SUCH AS ELGAMAL ENCRYPTED DATA FOR SECURE MULTI-AUTHORITY ELECTIONS

(75) Inventor: C. Andrew Neff, Bellevue, WA (US)

(73) Assignee: VoteHere, Inc., Bellevue, WA (US)

( * ) Notice: Subject to any disclaimer, the term of this patent is extended or adjusted under 35 U.S.C. 154(b) by 843 days.

(21) Appl. No.: 09/816,869

(22) Filed: Mar. 24, 2001

(65) Prior Publication Data

US 2002/0007457 A1 Jan. 17, 2002

Related U.S. Application Data

(60) Provisional application No. 60/268,551, filed on Feb. 14, 2001, provisional application No. 60/252,376, filed on Nov. 21, 2000, and provisional application No. 60/191,785, filed on Mar. 24, 2000.

(51) Int. Cl.[7] .............................................. H04L 9/00
(52) U.S. Cl. ........................................ 713/201; 705/12
(58) Field of Search .......................... 705/12; 235/386; 380/28, 30; 713/201

(56) References Cited

U.S. PATENT DOCUMENTS

| 4,774,665 | A | | 9/1988 | Webb |
|---|---|---|---|---|
| 5,278,753 | A | | 1/1994 | Graft, III |
| 5,400,248 | A | | 3/1995 | Chisholm |
| 5,495,532 | A | | 2/1996 | Kilian et al. |
| 5,521,980 | A | | 5/1996 | Brands |
| 5,610,383 | A | | 3/1997 | Chumbley |
| 5,682,430 | A | * | 10/1997 | Kilian et al. .................. 380/30 |
| 5,708,714 | A | | 1/1998 | López et al. |
| 5,717,759 | A | | 2/1998 | Micali |
| 5,864,667 | A | | 1/1999 | Barkan |
| 5,875,432 | A | | 2/1999 | Sehr |
| 5,878,399 | A | | 3/1999 | Peralto |
| 6,021,200 | A | | 2/2000 | Fischer |
| 6,081,793 | A | * | 6/2000 | Challener et al. ............. 705/50 |
| 6,092,051 | A | | 7/2000 | Kilian et al. |
| 6,250,548 | B1 | | 6/2001 | McClure et al. |
| 6,317,833 | B1 | | 11/2001 | Jakobsson |
| 6,550,675 | B2 | * | 4/2003 | Davis et al. ................. 235/386 |
| 6,769,613 | B2 | | 8/2004 | McDermott et al. |

FOREIGN PATENT DOCUMENTS

| CA | 2176990 | 11/1996 |
|---|---|---|
| EP | 0 697 776 A2 | 2/1996 |
| EP | 0 743 620 A2 | 11/1996 |
| WO | WO92/03805 A1 | 3/1992 |
| WO | WO 98/14921 | 4/1998 |
| WO | WO01/22200 A2 | 3/2001 |

OTHER PUBLICATIONS

International Preliminary Examination Report, International Application No. PCT/US01/43962, Jun. 3, 2003, 4 pages.

(Continued)

*Primary Examiner*—Andrew Caldwell
*Assistant Examiner*—Ellen C Tran
(74) *Attorney, Agent, or Firm*—Perkins Coie LLP

(57) ABSTRACT

A cryptographic process permits one to verifiably shuffle a series of input data elements. One or more authorities or individuals "shuffle," or "anonymize" the input data (e.g. public keys in discrete log form or ElGamal encrypted ballot data). The process includes a validity construction that prevents any one or more of the authorities or individuals from making any changes to the original data without being discovered by anyone auditing a resulting proof transcript. The shuffling may be performed at various times. In the election example, the shuffling may be performed, e.g., after ballots are collected or during the registration, or ballot request phase of the election, thereby anonymizing the identities of the voters.

35 Claims, 7 Drawing Sheets

OTHER PUBLICATIONS

Benaloh, J., "Secret Sharing Homomorphisms: Keeping Shares of a Secret Secret", Advances in Cryptology—CRYPTO 1986, Lecture Notes in Computer Science, pp. 251–260, Springer–Verlag, Berlin, 1987.

Benaloh, J., et al., "Distributing the Power of a Government to Enhance the Privacy of Voters", ACM Symposium on Principles of Distributed Computing, pp. 52–62, 1986.

Borrell, Joan et al., "An implementable secure voting scheme", *Computers & Security*, Elsevier Science, Ltd., Great Britain, 1996, vol. 15, No. 4, pp. 327–338.

Chaum, D, "Elections with Unconditionally–Secret Ballots and Disruption Equivalent to Breaking RSA", EUROCRYPT 1988, pp. 177–182.

Chaum, D., "Untraceable Electronic Mail, Return Address, and Digital Pseudonyms", Communications of the ACM, 24(2):84–88, 1981.

Cramer, R, et al., "A Secure and Optimally Efficient Multi–Authority Election Scheme", Advances in Cryptology—EUROCRYPT 1997, Lecture Notes in Computer Science, Springer–Verlag, 1997.

Cramer, R., et al., "Multi–Authority, Secret–Ballot Elections with Linear Work", Advances in Cryptology—EUROCRYPT 1996, Lecture Notes in Computer Science, Springer–Verlag, Berlin, 1996.

Cramer, R., et al., Proofs of Partial Knowledge and Simplified Design of Cryptology—CRYPTO 1994, Lecture Notes in Computer Science, pp. 174–187, Springer–Verlag, Berlin, 1994.

Cranor, Lorrie et al., "Sensus: A Security–Conscious Electronic Polling System for the Internet", Proceedings of the Hawaii International Conference on System Sciences, IEEE 1997, pp. 561–570.

Diffie, W., et al., "New Directions in Cryptography", IEEE Transactions on Information Theory, 22(6):644–654, 1976.

ElGamal, T., "A Public Key Cryptosystem and a Signature Scheme Based on Discrete Logarithms", IEEE Transactions on Information Theory, IT–31(4):469–472, 1985.

Fiat, A., et al., "How to Prove Yourself: Practical Solutions to Identification and Signature Problems", Advances in Cryptology—CRYPTO 1986, Lecture Notes in Computer Science, pp. 186–194, Springer–Verlag, New York, 1987.

Fujioka, A., et al., "A Practical Secret Voting Scheme for Large Scale Elections", Advances in Cryptology—AUSCRYPT 1992, Lecture Notes in Computer Science, pp. 244–251, Springer–Verlag, 1992.

Gennaro, R., "Achieving independence efficiently and securely" Proceedings $14^{th}$ ACM Symposium on Principles of Distributed Computing (PODC 1995), New York 1995.

Iverson, K., "A Cryptographic Scheme for Computerized General Elections", CRYPTO 1991, pp. 405–419.

Jan, Jin–Ke et al., "A Secure Electronic Voting Protocol with IC Cards", Elsevier Science Inc., New York, J. Systems Software 1997, 39:93–101.

Mu, Yi et al., "Anonymous Secure E–Voting over a Network", Proceedings, Annual Computer Security Applications Conference, IEEE 1998, pp. 293–299.

Odlyzko, A. M., "Discrete logarithms in finite fields and their cryptographic significance" Advances in Cryptology—EUROCRYPT 1984, Notes in Computer Science, Springer–Verlag, 1984.

Park, C., et al., "Efficient Anonymous Channel and All/Nothing Election Scheme", Advances in Cryptology—EUROCRYPT 1993, Lecture Notes in Computer Science, pp. 248–259, Springer–Verlag, 1993.

Pedersen, T., "A Threshold Cryptosystem without a Trusted Party", Advances in Cryptology—EUROCRYPT 1991, Lecture Notes in Computer Science, pp. 522–526, Springer–Verlag, 1991.

Sako, K., et al, Receipt–Free Mix–Type Voting Scheme—A practical solution to the implementation of a voting booth–, EUROCRYPT 1995, pp. 393–403.

Sako, K., et al., "Secure Voting Using Partially Compatible Homomorphisms", Advances in Cryptology—CRYPTO 1994, Lecture Notes in Computer Science, Springer–Verlag, 1994.

Schnorr, C.P., "Efficient Signature Generation by Smart Cards", Journal of Cryptology, 4(3):161–174, 1991.

Schoenmakers, B., "A Simple Publicly Verifiable Secret Sharing Scheme and its Application to Electronic Voting", Advances in Cryptology—CRYPTO 1999, Lecture Notes in Computer Science, pp. 1–17, Springer–Verlag 1999.

Shamir, A., "How to Share a Secret", Communications of the ACM, 22(11):612–613, 1979.

Cranor, L. F., "Electronic Voting, Computerized polls may save money, protect privacy," Crossroads, The ACM's First Electronic Publication, May 6, 1999, 4 pages.

Herschberg, M. A., "Secure Electronic Voting Over the World Wide Web," Massachusetts Institute of Technology, May 27, 1997, 81 pages.

* cited by examiner though no analysis of the proof size is done in the K. Sako paper, it appears that, in order to obtain similarly low cheating probability, it will need to be orders of magnitude larger than the size of the proof provided herein. (Moreover, if the K. Sako protocol is implemented non-interactively, the cheating probability would need to be chosen exceedingly small, because a malicious participant might use considerable off-line computation to generate a forged proof by exhaustive search. This of course, could be the case with the protocols described, but the probability k/q is, for all practical values of k and q, certainly small enough.)

VERIFIABLE, SECRET SHUFFLES OF ENCRYPTED DATA, SUCH AS ELGAMAL ENCRYPTED DATA FOR SECURE MULTI-AUTHORITY ELECTIONS

CROSS-REFERENCE TO RELATED APPLICATIONS

This application claims the benefit of U.S. Provisional Patent Applications Nos. 60/191,785, filed Mar. 24, 2000 and 60/252,376, filed Nov. 21, 2000, both entitled "Verifiable, Secret Shuffles of El-Gamal Encrypted Data," and 60/268,551, filed Feb. 14, 2001, entitled "Verifiable, Secret Shuffles of El-Gamal Encrypted Data for Secure Multi-Authority Elections," all by the same inventor and currently pending.

TECHNICAL FIELD

The following relates generally to encryption, and more specifically to electronic encryption such as for use in voting schemes.

BACKGROUND AND SUMMARY

The notion of a shuffle of a collection of objects, records, or tokens is simple and intuitive, and useful examples abound in various daily human activities. A gambler in a casino knows that when he picks up his hand of cards, each one will be one of 52 unique values, and that no one else at the table will have duplicates of the ones he holds. He does not, however, have any knowledge of how the cards are distributed, even though he may have recorded the exact card order before they were shuffled by the dealer.

In the context of electronic data, the problem of achieving the same kind of random, yet verifiable permutation of an input sequence is surprisingly difficult. The problem is that the data itself is either always visible to the auditor, or it isn't. If it is, then the correspondence between input records and output records is trivial to reconstruct by the auditor or other observer. If it isn't, then input and output records must be different representations of the same underlying data. But if the output is different enough (that is, encrypted well enough) that the auditor cannot reconstruct the correspondence, then how can the auditor be sure that the shuffler did not change the underlying data in the process of shuffling?

Most of the description below is devoted to giving an efficient (linear) method for solving this problem in an important context—ElGamal encrypted data. In order to make the exposition as clear and concise as possible, the majority of the description below explicitly refers to the specific case where operations are carried out in $Z^*_p$, the multiplicative group of units modulo a large prime, p. However, the only properties of the underlying (multiplicative) group used is that the associated ElGamal cryptosystem should be secure, and that the Chaum-Pedersen protocol for the relation $\log_g X = \log_h Y = u$ (D. Chaum. Zero-knowledge undeniable signatures. Advances in Cryptology—EUROCRYPT '90, Lecture Notes in Computer Science, volume 473, pages 458–464, Springer-Verlag, 1991. D. Chaum and T. P. Pedersen. Wallet Databases With Observers. *In Advances in Cryptology—CRYPTO'92*, Volume 740 of *Lecture Notes in Computer Science*, pages 89–105, Berlin, 1993. Springer-Verlag.) should not leak information about the secret exponent, u. In fact, for one embodiment, a universally verifiable, multi-authority election protocol—the verifier will be implemented via the Fiat-Shamir heuristic (A. Fiat, A. Shamir. How to prove yourself: Practical solutions to identification and signature problems. Advances in Cryptology—CRYPTO '86, Lecture Notes in Computer Science, pp. 186–194, Springer-Verlag, New York, 1987.), so in this case it is sufficient that the protocol be zero-knowledge against an honest verifier. (R. Cramer, R. Gennaro, B. Schoenmakers. A secure and optimally efficient multi-authority election scheme. Advances in Cryptology—EUROCRYPT '97, Lecture Notes in Computer Science, Springer-Verlag, 1997.) Thus, the shuffle protocol is also useful when the ElGamal cryptosystem is implemented over other groups such as elliptic curves. The general Boolean proof techniques of R. Cramer, I. Damgrd, B. Schoenmakers, Proofs of partial knowledge and simplified design of witness hiding protocols (Advances in Cryptology—CRYPTO '94, Lecture Notes in Computer Science, pp. 174–187, Springer-Verlag, Berlin, 1994.), can also be used to construct a proof with the same properties, however, the resulting proof size (complexity) is quadratic, or worse, in the size of the input sequence.

The protocols or methods described below also offer several advantages over the cut-and-choose technique as used in K. Sako, J. Kilian. Receipt-free mix-type voting scheme—A practical solution to the implementation of a voting booth, Advances in Cryptology—EUROCRYPT '95, Lecture Notes in Computer Science, Springer-Verlag, 1995. In this approach, the size of the proof is dependent on the probability of a cheating prover that is required to satisfy all participants. In the shuffle protocol described herein, this cheating probability is essentially k/q, where k is the number of elements to be shuffled, and q is the size of the subgroup of $Z^*_p$ in which the elements are encrypted. Although no analysis of the proof size is done in the K. Sako paper, it appears that, in order to obtain similarly low cheating probability, it will need to be orders of magnitude larger than the size of the proof provided herein. (Moreover, if the K. Sako protocol is implemented non-interactively, the cheating probability would need to be chosen exceedingly small, because a malicious participant might use considerable off-line computation to generate a forged proof by exhaustive search. This of course, could be the case with the protocols described, but the probability k/q is, for all practical values of k and q, certainly small enough.)

The advantage of the current scheme becomes even more apparent when seen in the context of the resulting universally verifiable election protocol. In K. Sako, each voter must interact sequentially with each "counting center" before actually casting his/her vote. On this account, it is unlikely that a useable implementation could be built for large scale, public sector elections in the near future. In contrast, protocols described below, put all authority participation (except, possibly, for the creation of basic election parameters) at the close of the election, purely for the purpose of tabulation.

This nice property is also found in the elegant homomorphic election protocol in the paper by R. Cramer, R. Gennaro, and B. Schoenmakers. However, that protocol can only be applied to ballots whose questions are of a simple "choose (at most) m of n" type. This effectively precludes "write-in" responses, as well as "proportional type" questions where the voter is expected to indicate answers in preferential order, and questions are tabulated in accordance with this preference. A couple of somewhat less important disadvantages of the R. Cramer, R. Gennaro, and B. Schoenmakers scheme are that it expands vote data size considerably, and that it requires a voter validity proof. This proof further expands the vote data size by about an order of magnitude, and is unattractive from a practical perspective, because it presumes special purpose code to be running on the voter's computer.

The protocol is described below constructed entirely from a sequence of Chaum-Pedersen proofs, and elementary arithmetic operations. It is thus simple to implement.

Figure 1:
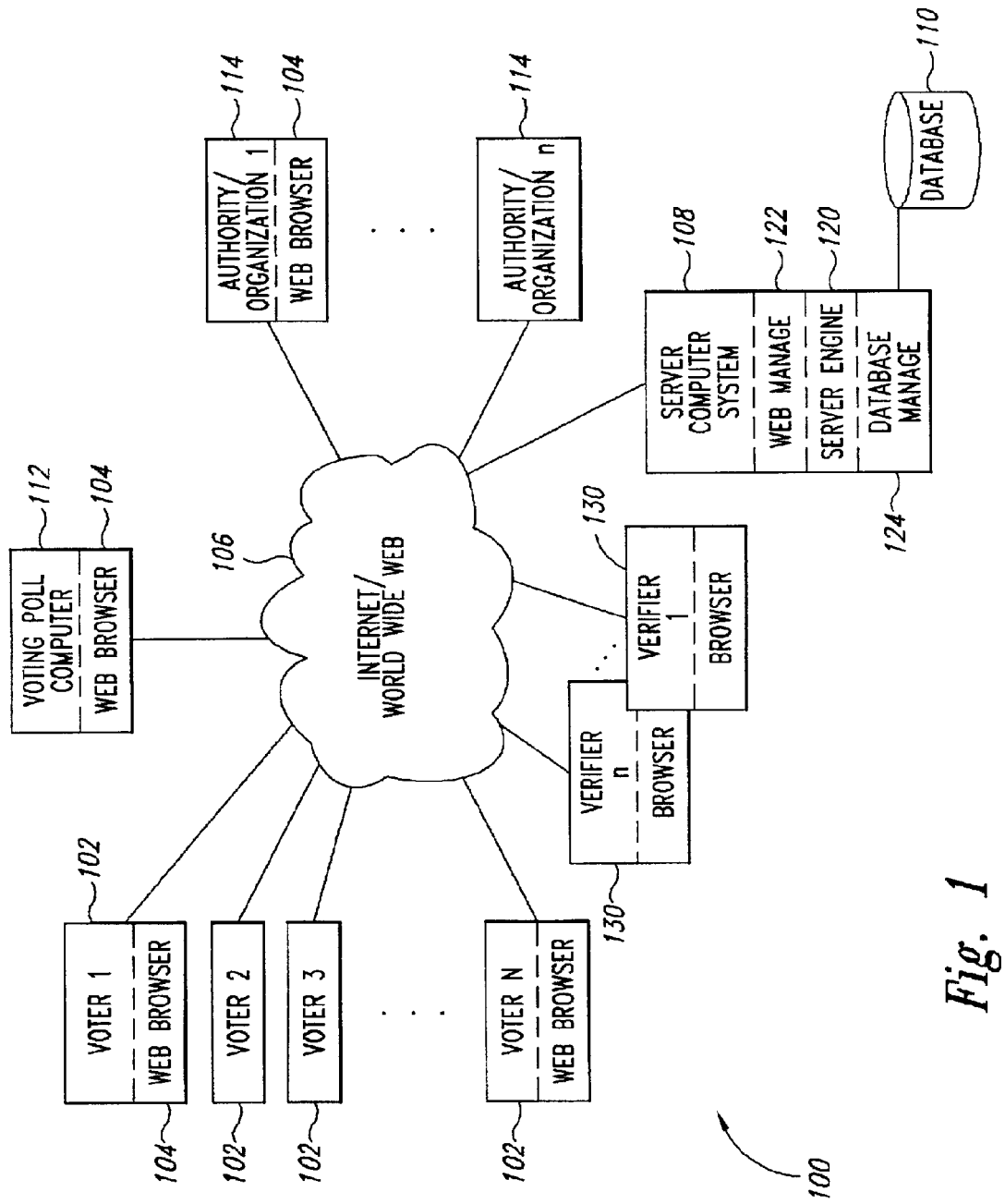
FIG. 1 is a block diagram illustrating a suitable environment for implementing embodiments of the invention.

In the drawings, identical reference numbers identify identical or substantially similar elements or acts. To easily identify the discussion of any particular element or act, the most significant digit or digits in a reference number refer to the Figure number in which that element is first introduced (e.g., element 204 is first introduced and discussed with respect to FIG. 2).

The headings provided herein are for convenience only and do not necessarily affect the scope or meaning of the claimed invention.

DETAILED DESCRIPTION

1. Overview

Described in detail below is a cryptographic protocol to verifiably shuffle a series of elements, such as an input sequence of public keys in discrete log form or k input ElGamal encryptions, that has applications in, e.g., a secure, universally verifiable, multi-authority election scheme. In the case of k input ElGamal encryptions, the output of the shuffle operation is another sequence of k ElGamal encryptions, each of which is a re-encryption (i.e., an ElGamal pair which encrypts exactly the same clear text) of exactly one of the input encryptions, but the order of elements in the output is kept secret. Though it is a trivial matter for the "shuffler" (who chooses the permutation of the elements to be applied and the encryption keys used) to compute the output from the input, the construction is important because it provides a linear size proof of correctness for the output sequence (i.e., a proof that it is of the form claimed) that can be checked by an arbitrary verifier. The security of the proof protocol is the same as that of the Chaum-Pedersen protocol for the relation $\log_g x = \log_h y$, which is sufficient for the election application in which it is used.

The following description provides specific details for a thorough understanding of, and enabling description for, embodiments of the invention. However, one skilled in the art will understand that the invention may be practiced without these details. In other instances, well known structures and functions have not been shown or described in detail to avoid unnecessarily obscuring the description of the embodiments of the invention.

Much of the detailed description provided below is explicitly disclosed in the provisional patent applications noted above; much of the additional material will be recognized by those skilled in the relevant art as being inherent in the detailed description provided in such provisional patent applications, or well known to those skilled in the relevant art. Those skilled in the relevant art can implement aspects of the invention based on the detailed description provided in the provisional patent applications.

The mathematical notation used here is readily understandable to those skilled in the relevant art; however, for those unfamiliar with the art, the following definitions and descriptions are provided. Such definitions, although brief, will help those generally unfamiliar with the art to more fully understand aspects of the invention based on the detailed description provided herein. Such definitions are further defined by the description of the invention as a whole (including the claims), and not simply by such definitions.

FIGS. 1–5, as well as the detailed description provided herein, describe protocols between a party (e.g., a voter) and a verifier (or between a proving party and a verifying party). The actions performed by the parties are grouped together into flow diagram boxes. In general, each line of text or equations in a box describes a step, such as a computation, transmittal of information, or storage or retrieval function. Such flow diagrams are read line by line and box by box.

The term "party" as generally used herein, indicates an entity, and might be an agent who performs a step or a collection of steps under the protocol. It may also refer to a means or method for performing some or all of the steps. Thus, some or all portions of the protocols may be performed under any suitable configuration of digital logic circuitry. For example, any or all steps under the protocol may be realized by not only a general purpose computer, such as a personal computer, but by a hard-wired or dedicated combinatorial logic device, or any sort of suitably programmed machine or microprocessor, so long as such device or machine performs the required processing steps, storage, input and output, and the like.

The symbol "$\in_R$" generally indicates that a number or numbers on the left-hand side are chosen from a set on the right-hand side according to a probability distribution that is substantially uniform and independent (random). In practice, a physical random number generator can be used, possibly in conjunction with additional post-processing, or a deterministic pseudo-random number generator. Methods of generating random numbers are known by those skilled in the relevant art.

The symbols "$\Pi$" and "$\Sigma$" respectively denote product and sum, which are indexed.

The symbol "$Z_p$" denotes a set of numbers of integers 0 through p–1, or ring of integers, modulo p. Addition and multiplication of elements in the ring $Z_p$ are defined modulo p.

The symbol "$\in$" denotes that an element on the left-hand side is a member or element of a set on the right-hand side.

The symbol "$\subset$" denotes that a set on the left-hand side is a subset of a set on the right-hand side, that is, that the set on the left-hand side is contained in the set on the right-hand side.

The angle brackets symbols (i.e., "< >") are paired symbols that generally indicate that the term or terms between them denote a subgroup generated by a subset of a given group or ring of integers (e.g, the ring $Z_p$). A subgroup is a subset of another group (or ring) that is also a group under the same binary operation (e.g., the integers are a subgroup of the real numbers under addition, but the integers modulo n are not a subgroup of these since the operations are differently defined.

In the following, unless explicitly stated otherwise, n will be a positive integer, p and q will be prime integers, publicly known. Arithmetic operations are performed in the modular ring $Z_p$ (or occasionally $Z_n$), and $g \in Z_p$ will have (prime) multiplicative order q. (So, trivially, $q|(p-1)$.) In each proof protocol, P will be the prover (shuffler) and V the verifier (auditor).

One embodiment described below, employs a $Z_p$ (ElGamal) cryptosystem, although an elliptic curve cryptosystem and cryptosystems under general groups may be used. Such cryptosystems employ public keys for asymmetrical cryptosystems. Public key systems employ so-called one-way functions and trap-door functions. A "one-way function" is a function that is relatively easy to calculate output therefrom but whose inverse functions are far more difficult to compute. For example, power functions are such that they are easy to compute the product of a number of equal factors, but the reverse operation of finding the root of a quantity, is more complicated. "Trap door" functions are similar to one-way functions, but where the inverse functions are extremely difficult unless some additional information is available. This additional information is typically the "private key" held by a party, such as a voter.

The below methods and protocols frequently use the Chaum-Pedersen proof of equality for discrete logarithms. For g, X, h, $Y \in Z_p$ this is a proof of knowledge for the relation $$\log_g X = \log_h Y \quad (1)$$

It is not known to be zero-knowledge, however it is known to be zero-knowledge against an honest verifier, which is sufficient for our main application where the verifier is implemented via the Fiat-Shamir heuristic.

"Zero-knowledge proofs" allow a voter or prover party to demonstrate knowledge of a secret while revealing no information whatsoever of use to the verifier party in conveying this demonstration of knowledge. Only a single bit of information is conveyed, namely that the prover party actually does know the secret. In other words, a voter and a verifying authority exchange messages, where the voter's objective is to convince the verifier the truth of an assertion, e.g., that the encrypted ballot is, or shuffled sequence of ballots or elements are, complete and correct, without revealing how the voter voted on each question in the ballot or how the series of elements were shuffled. Under such zero-knowledge proofs, each voter or prover party effectively generates certain numbers that only a person having his or her own private key could generate. A verifier or authenticating party then confirms that each calculated number indeed is generated under a known algorithm to thereby authenticate the voter and that his or her electronic ballot is complete and correct or "well-formed" for all allowable choices and constraints, or that the series of elements have not been altered (besides being shuffled and encrypted).

Definition 1 An instance of the Chaum-Pedersen proof, as above, will be denoted by CP(g, X, h, Y).

Definition 2 For fixed $g \in Z^*_p$ be the binary operator on $\langle g \rangle \times \langle g \rangle$ denotes subgroup generated by a subset of a ring defined by $$\log_g(x \hat{t}_g y) = \log_g x \log_g y$$

for all x, $y \in \langle g \rangle$. Alternatively $$g^a \hat{x}_g g^b = g^{ab} = (g^a)^b = (g^b)^a$$

for all a, $b \in Z_q$. Following the indexing conventions used for summations and multiplications, we also use the notation $$\bigotimes_{i=1}^{k} {}_g X_i = X_0 \otimes_g X_1 \otimes_g \ldots \otimes_g X_k$$

This operation as is referred to herein as logarithmic multiplication base g.

In each of the notations in the preceding definition, the subscript g may be omitted when its value is clear from context. As generally used herein, "binary operator" refers to an operator defined on a set which takes two elements from the set as inputs and returns a single element.

Remark 1 Notice that in the Chaum-Pedersen proof, if $h=g^s$, and the common logarithm is $u=\log_g X = \log_h Y$, then CP (g, X, h, Y) is obviously also a proof of the relation $Y = h \hat{x}_g X = x \hat{X}_g h$.

Remark 2 The above proof is obviously zero-knowledge with respect to s, since the Prover need not have any knowledge of this value in order to construct the proof.

Note the following collection of well-known results since they will be heavily used in the remainder of the detailed description.

Lemma 1 Let $f(x) \in Z_q[x]$, be a polynomial of degree d. Then there are at most d values $z_1, \ldots, z_d \in Z_q$ such that $f(z_i)=0$.

Corollary 1 Let f(x), $g(x) \in Z_q[x]$ be two polynomials of degree at most d, with $f \neq g$.
Then there are at most d values $z_1, \ldots, z_d \in Z_q$ such that $f(z_i) = g(z_i)$.

Corollary 2 Let f(x), $g(x) \in Z_q[x]$ be two polynomials of degree at most d, with $f \neq g$.
If $C \in_R Z_q$ (c is selected at random from $Z_q$), then the following probability holds:

$$P(\{c: f(c) = g(c)\}) \leq \frac{d}{q}$$

Lemma 2 Let $Z_q^k$ be the standard k-dimensional vector space over $Z_q$, and fix $v = (v_1, \ldots, v_k) \in Z_q^k$, $v \neq 0$. If $r \in_R Z_q^k$ is chosen at random, then $$P(\{r: v \cdot r = 0\}) = \frac{1}{q}$$

2. Proofs for Iterated Logarithmic Multiplication

For the rest of this section, all logarithmic multiplications will be computed relative to a fixed element g, and hence we will omit the subscript in notation. The following problem is fundamental to the shuffle proofs which are to come later.

Iterated Logarithmic Multiplication Problem: Two sequences $\{X_i\}_{i=1}^k$ and $\{Y_i\}_{i=1}^k$ are publicly known. The Prover, P, also knows $u_i = \log_g X_i$ and $v_i = \log_g Y_i$ for all i, but these are unknown to the verifier, V. P is required to convince V of the relation $$\bigotimes_{i=1}^{k} X_i = \bigotimes_{i=1}^{k} Y_i \quad (2)$$

without revealing any information about the secret logarithms $u_i$ and $v_i$.

Intuitively, this problem is simple in light of Remark 1. The Prover can construct two sequences of k Chaum-Pedersen proofs to convince V of both the value of $$\bigotimes_{i=1}^{k} X_i$$

and the value of $$\bigotimes_{i=1}^{k} Y_i,$$

and V can then check that these two values are the same. If all the $X_i$ and $Y_i$ are known to be random and independent, this might be acceptable for the purpose of keeping the $u_i$ and $v_i$ secret and may be implemented under one embodiment of the invention, but it is clear that this protocol reveals some information that V can not compute himself, namely the values of $$\bigotimes_{i=1}^{k} X_i, \bigotimes_{i=1}^{k} Y_i,$$

as well as the intermediate logarithmic multiplications. in order to strengthen the protocol, the depicted embodiment and method described in detail below introduces some randomness in order to ensure that it leaks no more information than the underlying Chaum-Pedersen protocol.

Iterated Logarithmic Multiplication Proof:

1. P secretly generates, randomly and independently, k+1 values $\{r_i\}_{i=0}^{k} \subset Z_q$ and reveals the exponentiated values $R_i = g^{r_i}$.

2. For each $1 \leq i \leq k$, P secretly computes $w_i = r_i u_i / r_{i-1}$, and reveals $W_i = g^{w_i}$, $z_i = w_i/v_i$.

3. P sets $Z_i = g^{z_i}$ and constructs the two Chaum-Pedersen proofs $$CP(R_{i-1}, X_i, R_i, W_i) \quad (3)$$

$$CP(Y_i, g_i, W_i, Z_i) \quad (4)$$

which he reveals to V. These two Chaum-Pedersen proofs taken together cannot reveal any more information about the secrets than the information that is revealed from each of them taken separately. The key to seeing this is Remark 2. The first proof is zero-knowledge with respect to $r_i/r_{i-1}$, though only honest verifier zero-knowledge with respect to $u_i/r_{i-1}$. But the second proof is zero-knowledge with respect to $r_i, r_{i-1}$ and $u_1$ since even the Prover need not know these values in order to generate the proof. Of course, one can gain some information about these values from the revealed value $z_i$, but only if some information is known about $v_i$. It is not known if this can happen with a dishonest verifier, but does not when the verifier is honest, and this is the case with embodiments and applications described below.

Clearly the quotients $r_i/r_{i-1}$ are all uniformly distributed and independent, so the values $z_i$, themselves do not reveal any information, by themselves, about the $u_1$ and $v_i$.

4. V checks that $Z_i = g^{z_i}$ and checks each Chaum-Pedersen proof.

5. V finally evaluates $$z = \prod_{i=1}^{k} z_i$$

and checks that $R_o^z = R_k$.

One can easily check that this protocol solves the iterated logarithmic multiplication problem by referring to Remark 1 and by simply multiplying out the exponents. The probability of a forged proof is bounded above by the probability that one or more of the Chaum-Pedersen proofs have been forged. Each of these probabilities is 1/q. Hence the overall probability of a forged proof is bounded above by 2k/q.

For reasons that will become apparent later, the following variant of the iterated logarithmic multiplication problem will actually be of more use to the method.

Scaled Iterated Logarithmic Multiplication Problem: As in the original problem, two sequences $\{X_i\}_{i=1}^{k}$ and $\{Y_i\}_{i=1}^{k}$ are publicly known, $u_i = \log_g X_i$ and $v_i = \log_g Y_i$ for all i are known to P, but secret from V. In addition, a constant $c \in Z_q$ is known only to P, but a commitment of c, $C = g^c$ is made known to V. P is required to convince V of the relation $$\bigotimes_{i=1}^{k} X_i^c = \bigotimes_{i=1}^{k} Y_i \quad (5)$$

without revealing any information about the secret logarithms $u_i$, $v_i$, and c.

Scaled Iterated Logarithmic Multiplication Proof:

The proof requires only a minor variation to the original. The Chaum-Pedersen proof in 4 needs to be replaced by the similar proof $$CP(Y_i, C_i, Wi, Z_i) \quad (6)$$

3. The Simple K-Shuffle

The first shuffle proof we construct requires a restrictive set of conditions. It will be useful for two reasons. First, it is a basic building block of the more general shuffle proof to come later. Fortuitously, it also serves a second important purpose. A single instance of this proof can be constructed to effectively "commit" a particular permutation. This can be important when shuffles need to be performed on tuples of $Z_p$ elements, which is exactly what is required in the voting application. (A "tuple" refers to a sequence or ordered set. For example, a 5-tuple or quintuple is an ordered set of five elements, while a k-tuple refers to a finite ordered set with an unspecified number of members.)

Simple k-Shuffle Problem: Two sequences of k elements of $Z_p$, $X_1, \ldots, X_k$ and $Y_1, \ldots, Y_k$ are publicly known. The Prover, P, also knows $u_i = \log_g X_i$ and $v_i = \log_g Y_i$, but these are unknown to the verifier, V. In addition, a constant $c \in Z_q$ is known only to P, but a commitment of c, $C = g^c$ is made known to V. P is required to convince V that there is some permutation, $\pi \in \Sigma_k$ with the property that $$Y_{\pi(i)} = X_i^c \quad (7)$$

for all $1 \leq i \leq k$ without revealing any information about $\pi$ or the secret c. The function $\pi$ corresponds to a function for mapping a set of input elements to a permuted set of output elements.

Simple k-Shuffle Proof: The proof construction is almost trivial in light of the previous section and Corollary 2.

1. V generates a random $t \in Z_q$ and gives it to P as a challenge.

2. P computes $T=g^t$ (also known V) and $S=T^c=g^{ct}$.

3. P generates the Chaum-Pedersen proof CP (g, C, T, S) and reveals this to V.

4. P computes publicly (i.e., checked by V) the values $U_i=T/X_i$ and $V_i=S/Y_i$. Note: $U_i$ and $V_i$ are chosen thusly to be more in line with the notation in Corollary 2. In one embodiment, the method implements the protocol with $U_i=X_i/T$ and $V_i=Y_i/S$ since divisions are computationally more expensive than multiplications.

The Prover executes the scaled iterated logarithmic multiplication proof protocol for the sequences $\{U_i\}_{i=1}^k$ and $\{V_i\}_{i=1}^k$ and the commitment C. By checking the scaled logarithmic multiplication proofs on sequences U and V, the verifier ensures that the desired relationship between the initial input sequence of elements X and the sequence Y holds (based on Collorary 2).

A forged proof can only be generated if either the scaled iterated logarithmic multiplication proof is forged, or the single proof of $S=T^c$ is forged, or, V happens to choose c from the exceptional set in Corollary 2. Hence the overall probability of a forged proof is bounded above by $(3k+1)/q$. Further information regarding proofs provided under the shuffle protocols described herein may be found in the above-referenced U.S. Provisional Patent Applications.

In general, the simple k-shuffle may be sufficient for some applications. To shuffle items, an individual needs to employ a cryptographic transformation (e.g., exponentiation) where there is certainty that a series or sequence of output elements $Y_1$ through $Y_k$ were derived from an original or input sequence of elements $X_1$ through $X_k$ based on constant cryptographic information, without revealing which of the original X elements produced a resulting Y element. Furthermore, individuals wish to provide such shuffling without also having to employ a burdensome proof of validity, such as cut and choose type of validity proofs known in the prior art that require numerous iterations for a sufficient level of proof. Instead, a series of k independent Chaum-Pedersen proofs based on a secret exponentiation value c are employed, as described herein.

4. The General K-Shuffle

An obvious limitation of the simple k-Shuffle protocol is that the shuffler, P, must know all the original exponents $s_1, \ldots, s_k$. In many applications this will not be the case. The next step is to eliminate this restriction.

General k-Shuffle Problem: Two sequences of k elements of $Z_p$, $X_1, \ldots, X_k$ and $Y_1, \ldots, Y_k$ are publicly known. In addition, a constant $c \in Z_q$ is known only to P, but a commitment of c, $C=g^c$ is made known to V. P is required to convince V that there is some permutation, $\pi \in \Sigma_k$, with the property that $$Y_{\pi(i)}=X_i^c \tag{8}$$

for all $1 \leq i \leq k$ without revealing any information about $\pi$ or the secret c.

General k-Shuffle Proof: The proof is constructed from a simple k-shuffle that has been "appropriately randomized" by the verifier, and an application of Lemma 2.

1. P generates a sequence $\{\bar{u}_i\}_{i=1}^k \subset Z_q$, randomly and independently and reveals the sequence $\overline{U}_i = g^{\bar{u}_i}$.

2. V generates another sequence $\{e_i\}_{i=1}^k \subset Z_q$, randomly and independently, and gives this to P as a challenge.

3. P publicly sets $U_i = g^{e_i}\overline{U}_i$, and secretly sets $u_i = e_i + \bar{u}_i$. By requiring the Prover to add a value generated by the Verifier prevents the Prover from picking certain secrets (exponents) and otherwise helps ensure encryption robustness.

4. P constructs a simple k-shuffle on the sequence $\{U_i\}_{i=1}^k$, with another commitment $D=g^d$ (different secret exponent), and inverse permutation, $\pi^{-1}$, resulting in the sequence $\{V_i\}_{i=1}^k = \{g^{v_i}\}_{i=1}^k$ and the corresponding proof as in the simple k-shuffle section.

(Recall that the $V_i$ are public, but the $v_i$ are secret to P.)

5. P publicly sets $A_i = X_1^{v_i}$ and $B_i = Y_i^{u_i}$ and reveals the Chaum-Pedersen proofs $$CP(g, V_i, X_i, A_i) \tag{9}$$

$$CP(g, U_i, Y_i, B_i) \tag{10}$$

Thus, the sequence of elements A and B correspond to the input sequence of elements X and Y.

6. Publicly, the values $$A = \prod_{i=1}^{k} A_i \tag{11}$$

$$B = \prod_{i=1}^{k} B_i \tag{12}$$

are evaluated.

7. P reveals the Chaum-Pedersen proof $$CP\,(D, A, C, B) \tag{13}$$

Steps 5–7 above effectively require the Prover to pin down the data to help ensure that the Prover has not tampered with the original data. (These steps differ from the simple shuffle description above.) A forged proof can only be generated if either the simple k-shuffle proof is forged, or one of the Chaum-Pedersen proofs is forged, or the tuple $(u_i, \ldots, u_k)$ is chosen from the exceptional set in Lemma 2. Hence the overall probability of forgery is bounded above by $$\frac{(3k+1)}{q} + \frac{2k}{q} + \frac{1}{q} = \frac{(5k+2)}{q} \tag{14}$$

5. K-Shuffles of Tuples

Those skilled in the relevant art will recognize that in the previous section, the choice of the simple shuffle essentially "froze" the permutation that could be proven. This makes it easy to see how to extend the previous section to shuffles of k tuples of elements of <g>. Thinking of a sequence of k l-tuples as a k×l array, a single simple k-shuffle can serve to prove that all columns have been permuted according to the same permutation, but each row left unchanged. Thus, the k shuffle described above is performed l times, once for each column of the array of k elements (each of the k shuffles reuses the simple shuffle). In particular, this extends to tuples of ElGamal pairs.

6. The Voting Application

Information regarding registering voters, forming and distributing ballots, storing ballots, and conducting an election employing encrypted, electronic ballots, may be found in U.S. patent application Ser. No. 09/535,927, filed Mar. 24, 2000, entitled "Multi-Way Election Method and Apparatus," Ser. No. 09/534,835, filed Mar. 24, 2000, entitled "Electronic Voting Scheme Employing Permanent Ballot Storage," Ser. No. 09/534,836, filed Mar. 24, 2000, entitled "Method, Article and Apparatus for Registering Registrants, Such as Voter Registrants", Ser. No. 60/252,762, filed Nov. 22, 2000, entitled "Election System," Ser. No. 60/270,182, filed Feb. 20, 2001, entitled "Method and Apparatus for Detection and Correction of Compromised Ballots in Secret, Remote, Electronic Voting Systems," and Ser. No. 60/272,883, filed Mar. 2, 2001, entitled "Information Theoretically Anonymous Signatures with Discrete Log Security."

In one embodiment, votes are submitted as ElGamal pairs of the form $(g^{\alpha_i}, h^{\alpha_i}m)$, (or a sequence of these pairs if more data is required), where m is some standard encoding of the voter choices (described herein), the $\alpha_1$ are generated secretly by the voters, and h is a public parameter constructed via a dealerless secret sharing scheme (see, e.g., T. Pedersen. A threshold cryptosystem without a trusted party, Advances in Cryptology—EUROCRYPT '91, Lecture Notes in Computer Science, pp. 522–526, Springer-Verlag, 1991.). Once the polls are closed (voting finished), an independent collection of authorities sequentially shuffles the ballots. On output of the final shuffle, the final collection of encrypted ballots is decrypted in accordance with the threshold scheme, and the clear text votes are tabulated in full view by normal election rules.

The authorities who participate in the sequential shuffles, may be arbitrary in number, and they may be completely different from those who hold shares of the election private key. The sequence of ballots which are finally decrypted can only be matched with the original sequence of submitted ballots if all of the shuffling authorities collude, since each of their permutations is completely arbitrary.

Each shuffle is performed by an individual authority as follows:
1. $\beta_i$ are chosen secretly, randomly and independently.
2. Each vote $v_i = (g^{\alpha_i}, h^{\alpha_i}m)$ is replaced, in sequence, by $(g^{\alpha_i+\beta_i}, h^{\alpha_i+\beta_i}m)$.

A Chaum-Pedersen proof is published without revealing the secrets.

3. A shuffle with secret exponent c is performed on the resulting encrypted votes.
4. Steps 1–2 are repeated.
5. At this point, the messages that are encrypted are the c-th power of the original messages. This is easily fixed by raising each coordinate of each vote to the 1/c power. A Chaum-Pedersen proof of this operation is equally easy to provide, thus keeping c secret while convincing verifiers, by simply reversing roles of g and $C=g^c$.

Steps 1 and 2 above help randomize the input data to prohibit one from tampering with it such as selecting a relationship between ballots before shuffling. The Chaum-Pedersen proof ensures the correctness of the additional value added for this randomizing. In an alternative embodiment, steps 1 and 2 may be omitted (and step 4).

7. Secure Message Encoding

If p−1 has small prime factors, some information about the encoded messages can be leaked. This is not a problem with the shuffle protocols, rather it is a problem for strongly encrypting the $m_i$ in the first place. Whether or not this is significant enough to worry about depends on the expected value of the messages to be encoded. This problem can also be eliminated however, by taking special care in the encoding. Each message can be projected onto a subgroup whose order contains only large prime factors. Since most embodiments described herein are restricted to the case where $|\langle g \rangle|$ is a prime, q, we will only discuss in detail the case p=2q+1. However, the more general case can be handled by an extension of these techniques.

Suppose that the bit length of p=2q+1 is b, that is $$2^{b-1} < p < 2^b$$

so $$2^{b-2} \leq (p-1)/2 = q < 2^{b-1} \quad (15)$$

We require that all messages m be of bit length at most b−2. Rather than encrypting each message as $(g^\alpha, h^\alpha m)$ as is standard, we encrypt it as $$(g^\alpha, h^{\alpha m^2})$$

This means that all messages are encoded with the same trivial projection on the order 2 subgroup of $Z^*_p$. Equation 15 guarantees that the map $m \rightarrow m^2$ is invertible on the domain of definition. To invert, simply take the unique square root which is less than (p−1)/2. Thus it is a simple matter to recover the original message, m, once the actual message, $m^2$, has been decrypted.

8. Suitable System

FIG. 1 and the following discussion provide a brief, general description of a suitable computing environment in which aspects of the invention can be implemented. Although not required, embodiments of the invention will be described in the general context of computer-executable instructions, such as routines executed by a general-purpose computer, such as a personal computer or web server. Those skilled in the relevant art will appreciate that aspects of the invention (such as small elections) can be practiced with other computer system configurations, including Internet appliances, hand-held devices, wearable computers, personal digital assistants ("PDAs"), multiprocessor systems, microprocessor-based or programmable consumer electronics, network PCs, mini computers, cell or mobile phones, set-top boxes, mainframe computers, and the like. Aspects of the invention can be embodied in a special purpose computer or data processor that is specifically programmed, configured or constructed to perform one or more of the computer-executable instructions explained herein. Indeed, the term "computer," as generally used herein, refers to any of the above devices, as well as any data processor.

The invention can also be practiced in distributed computing environments where tasks or modules are performed by remote processing devices, which are linked through a communications network, such as a Local Area Network (LAN), Wide Area Network (WAN), or the Internet. In a distributed computing environment, program modules or sub-routines may be located in both local and remote memory storage devices. The invention described herein may be stored or distributed on computer-readable media, including magnetic and optically readable and removable computer disks, stored as firmware in chips, as well as distributed electronically over the Internet or other networks (including wireless networks). Those skilled in the relevant art will recognize that portions of the protocols described herein may reside on a server computer, while corresponding portions reside on client computers. Data structures and transmission of data particular to such protocols are also encompassed within the scope of the invention.

Unless described otherwise, the construction and operation of the various blocks shown in FIG. 1 are of conventional design. As a result, such blocks need not be described in further detail herein, as they will be readily understood by those skilled in the relevant art.

Referring to FIG. 1, a suitable environment of system 100 includes one or more voter or client computers 102, each of which includes a browser program module 104 that permits the computer to access and exchange data with the Internet, including web sites within the World Wide Web portion 106 of the Internet. The voter computers 102 may include one or more central processing units or other logic processing circuitry, memory, input devices (e.g., keyboards, microphones, touch screens, and pointing devices), output devices (e.g., display devices, audio speakers and printers), and storage devices (e.g., fixed, floppy, and optical disk drives), all well known but not shown in FIG. 1. The voter computers 102 may also include other program modules, such as an operating system, one or more application programs (e.g., word processing or spread sheet applications), and the like. As shown in FIG. 1, there are N number of voter computers 102, representing voters 1, 2, 3 . . . N.

A server computer system 108 or "vote collection center," coupled to the Internet or World Wide Web ("Web") 106, performs much or all of the ballot collection, storing and other processes. A database 110, coupled to the server computer 108, stores much of the web pages and data (including ballots and shuffle validity proofs) exchanged between the voter computers 102, one or more voting poll computers 112 and the server computer 108. The voting poll computer 112 is a personal computer, server computer, mini-computer, or the like, positioned at a public voting location to permit members of the public, or voters who may not have ready access to computers coupled to the Internet 106, to electronically vote under the system described herein. Thus, the voter computers 102 may be positioned at individual voter's homes, where one or more voting poll computers 112 are located publicly or otherwise accessible to voters in a public election. The voting poll computer 112 may include a local area network (LAN) having one server computer and several client computers or voter terminals coupled thereto via the LAN to thereby permit several voters to vote simultaneously or in parallel.

The voting poll computer may also include an iButton reader for reading iButtons, such as cryptographic iButtons provided by Dallas Semiconductor Corp. An iButton is a 16 mm computer chip armored in a stainless steel can that may include a microprocessor for high-speed arithmetic computations necessary to encrypt and decrypt information, such as signatures of voters who have registered. Further information may be found at http://www.ibutton.com. Of course, other data storage devices besides iButtons may be employed, such as computer readable media described herein, radio frequency identification (RFID) tags, one or two dimensional bar codes or other data collection devices, and associated readers for these.

Under an alternative embodiment, the system 100 may be used in the context of a private election, such as the election of corporate officers or board members. Under this embodiment, the voter computers 102 may be laptops or desktop computers of shareholders, and the voting poll computer 112 can be one or more computers positioned within the company (e.g., in the lobby) performing the election. Thus, shareholders may visit the company to access the voting poll computer 112 to cast their votes.

One or more authority or organization computers 114 are also coupled to the server computer system 108 via the Internet 106. The authority computers 114 each hold a key necessary to decrypt the electronic ballots stored in the database 110. Threshold cryptographic systems require that a subset t of the total number of authorities n (i.e., t<n) agree to decrypt the ballots, to thereby avoid the requirement that all authorities are needed for ballot decryption. In other words, the objective of a threshold cryptosystem is to share a private key, s, among n members of a group such that messages can be decrypted when a substantial subset, T, cooperate—a (t, n) threshold cryptosystem. Protocols are defined to (1) generate keys jointly among the group, and (2) decrypt messages without reconstructing the private key. The authority computers 114 may provide their decryption share to the server computer system 108 after the voting period ends so that the server computer system may decrypt the ballots and tally the results.

Furthermore, under the depicted embodiment, each of the authority computers perform one shuffle of the ballots, as described herein. In conjunction with each shuffle, each authority computer generates a shuffle validity proof, which may be encrypted and forwarded to the server computer 108, or stored locally by the authority computer. In an alternative embodiment, an additional set of authority computers are provided, where one set of authority computers shuffle the encrypted ballots and generate shuffle validity proofs, while the second set of authority computers employ keys shares for decrypting the ballots.

One or more optional verifier computers 130 may also be provided, similar to the authority computers 114. The verifier computers may receive election transcripts to verify that the election has not been compromised. For example, the verifier computers may receive the shuffle validity proofs from each of the authority computers, as described herein. The verifier computers may perform verifications after the election, and need not be connected to the Internet. Indeed, the verifications may be performed by other computers shown or described herein.

The server, verifier or authority computers may perform voter registration protocols, or separate registration computers may be provided (not shown). The registration computers may include biometric readers for reading biometric data of registrants, such as fingerprint data, voice fingerprint data, digital picture comparison, and other techniques known by those skilled in the relevant art. Voter registration and issuing anonymous certificates for use with verifiable shuffles is described below.

The server computer 108 includes a server engine 120, a web page management component 122, a database management component 124, as well as other components not shown. The server engine 120 performs, in addition to standard functionality, portions of the electronic voting protocol. The encryption protocol may be stored on the server computer, and portions of such protocol also stored on the client computers, together with appropriate constants. Indeed, the above protocol may be stored and distributed on computer readable media, including magnetic and optically readable and removable computer disks, microcode stored on semiconductor chips (e.g., EEPROM), as well as distributed electronically over the Internet or other networks. Those skilled in the relevant art will recognize that portions of the protocol reside on the server computer, while corresponding portions reside on the client computer. Data structures and transmission of data particular to the above protocol are also encompassed within the present invention. Thus, the server engine 120 may perform all necessary ballot transmission to authorized voters, ballot collection, verifying ballots (e.g., checking digital signatures and passing verification of included proofs of validity in ballots), vote aggregation, ballot decryption and/or vote tabulation. Under an alternative embodiment, the server engine 120 simply collects all electronic ballots as a data collection center. The electronic ballots are then stored and provided to a third party organization conducting the election, such as a municipality, together with tools to shuffle ballots, decrypt the tally and produce election results. Likewise, election audit information, such as shuffle validity proofs and the like may be stored locally or provided to a municipality or other organization.

The web page component 122 handles creation and display or routing of web pages such as an electronic ballot box web page, as described below. Voters and users may access the server computer 108 by means of a URL associated therewith, such as http:www.votehere.net, or a URL associated with the election, such as a URL for a municipality. The municipality may host or operate the server computer system 108 directly, or automatically forward such received electronic ballots to a third party vote authorizer who may operate the server computer system. The URL, or any link or address noted herein, can be any resource locator.

The web page management process 122 and server computer 108 may have secure sections or pages that may only be accessed by authorized people, such as authorized voters or system administrators. The server computer 108 may employ a secure socket layer ("SSL") and tokens or cookies to authenticate such users. Indeed, for small elections, or those where the probability of fraud is low (or results of fraud are relatively inconsequential), the system 100 may employ such simple network security measures for gathering and storing votes as explained below, rather than employing complex electronic encrypted ballots, as described in the above-noted patent application. Methods of authenticating users (such as through the use of passwords), establishing secure transmission connections, and providing secure servers and web pages are known to those skilled in the relevant art.

The election scheme and system uses a "bulletin board" where each posting is digitally signed and nothing can be erased. See papers by K. Sako, J. Kilian, R. and Cramer, R. Gennaro, B. Schoenmakers. The bulletin board is implemented as a web server. The "ballot box" resides on the bulletin board and holds all of the encrypted ballots. Erasing can be prevented by writing the web server data to a write-once, read-many (WORM) permanent storage medium or similar device. Further details on such a bulletin board system are found in U.S. patent application Ser. No. 09/534,836, entitled "Electronic Voting Scheme Employing Permanent Ballot Storage."

Note that while one embodiment of the invention is described herein as employing the Internet to connect computers, other alternative embodiments are possible. For example, aspects of the invention may be employed by stand alone computers. Aspects of the invention may also be employed by any interconnected data processing machines. Rather than employing a browser, such machines may employ client software for implementing aspects of the methods or protocols described herein.

9. Election Example

One application of the general k-shuffle protocol is in the area of electronic voting. In order to make an election universally verifiable, submitted ballots must initially be irrefutably connectable to a valid (i.e., registered) voter. Somehow ballots must be "separated from their signatures" by a verifiable process—i.e., one that does not allow phony ballots to be substituted in the separation process—before they can be "opened".

The protocol we present here relies on a set of N "tabulation authorities" with differing interests in the election results.

1. The protocol is a threshold scheme in that at least t authorities must behave honestly in order for tabulation to be completed. (The parameter t can be chosen in advance of the election to be any value $1 \leq t \leq N$.) Thus, in particular, it is not necessary that the authorities complete their shuffles in any particular order, nor is it even necessary (except in the special case t=N) that all the authorities participate.

2. Even if all the authorities conspire, they cannot produce false election results without being caught by an external auditor who wishes to verify the results 3. Privacy of an individual vote can only be compromised by a conspiracy of at least t of the authorities to do so.

The protocol proceeds as follows:

First: Initialize Election

1. The authorities first agree on the election parameters:

(a) Parameters necessary for any election, including: the set of eligible voters, the ballot questions, the ballot answers, the ballot style, the time the polls are to be opened and closed, etc.

(b) The collection of tabulation authorities: i.e., themselves. (We henceforth use N to denote the number of authorities in this group.)

(c) The threshold parameter, t.

(d) A shuffle parameter, $1 \leq s \leq t$. (s=t is a natural choice.)

(e) A group G and a subgroup generator, $g \in G$. (In order to achieve secure encryption, the prime factors of $|g|$ should be large, however, this requirement is, of course, open to interpretation by the authorities themselves.)

(f) A standard "bit encoding" for response(s) (e.g., ASCII) and a small "message multiplicity" integer $d \geq 1$. The message multiplicity refers an agreed upon subdivision of each ballot, and corresponds to ballot formatting (similar to the layout of a paper ballot to indicate where responses to each ballot question are to be located). d is typically chosen as small as possible to accommodate the ballot response size. Most often, d=1 will work, because the message multiplicity is determined by the key length, and because a sufficiently large key length (e.g., 1024 bits) can accommodate most ballots having a reasonable number of questions.

(g) A group element $h \in \langle g \rangle$ which is created by way of an (N, t)—secret sharing scheme executed by the authorities. (See, T. Pedersen article.

2. Once agreement is reached on the election parameters, the authorities all "sign" them, and some representation of this signed set of parameters becomes the signed ballot.

Second: Vote

1. During the election (i.e., while "polls are open"), each voter V, encodes his response(s) by the election standard "bit encoding" (agreed upon and signed by the authorities during election initialization—see above) into a sequence of messages, $m_1, \ldots, m_d \in G$. (More on this in section below.) The "message multiplicity," d is another election parameter (see above).

2. V selects exponents $\alpha_1, \ldots, \alpha_d$ independently at random from $0 \leq \alpha_j < |g|$ for the encryption.

3. V returns to the ballot collection center, the encrypted response sequence $$(g^{\alpha_1}, h^{\alpha_1} m_1^2) \ldots, (g^{\alpha_d}, h^{\alpha_1}, m_d^2) \qquad (16)$$

along with an "attached" digital signature, created by V, to authenticate the response by tying it to a particular eligible voter.

4. If the digital signature submitted by V verifies and V has not previously been issued a ballot, then V is issued a receipt, signed by the central collection agency. This receipt acknowledges that a ballot from this voter, in this particular election, has been received, but includes no information (not even encrypted or hashed information) about the contents of the ballot. The receipt may also be broadcast to the voter. The receipt also serves to confirm that the voter's ballot was not lost and not maliciously deleted.

Third: Tabulate Results

1. At the start, the collection of voter responses are laid out in 2d sequences, each of length $N_{cast}$, where $N_{cast}$ is the total number of ballot responses received. Each sequence corresponds to a coordinate in the standard ballot response format (equation 16). The entries in each sequence are ordered by voter. The index assigned to each voter is not important, just so long as the indices are consistent. This way, an external observer can check that the signed ballots have been transformed in a very simple way, and that, applying the right interpretation to the data layout, it still represents the same set of responses that were signed and received.

2. In any convenient order, a sequence of s authorities each execute the following steps:
   (a) Let S be the authority currently in sequence.
   (b) S selects independently at random $dN_{cast}$ exponents $$1 \leq \beta_{jl} < |g|, \; 1 \leq j \leq N_{cast} \text{ and } 1 \leq l \leq d$$

(c) S calculates the group elements $g_s(j, l) = g^{\beta_{jl}}$ and $h_s(j, l) = h^{\beta_{jl}}$. Further, an intermediate Chaum-Pedersen proof is generated on $(g, g_s(j, l), h, h_s(j, l))$.
   (d) S then transforms the 2d input sequences into 2d intermediate sequences. The j-th entry of the l-th input sequence of the form $g^\alpha m$ is transformed by multiplying it by $g_s(j, l)$ and the j-th entry of the l-th input sequence of the form $h^\alpha m$ is transformed by multiplying it by $h_s(j, l)$. The transformed entries are all kept in the same order.
   (e) S chooses a random exponent $0 \leq c < |g|$, and a random permutation $\pi_1 \in \Sigma_{Ncast}$, and commits $h_s = g^c$.
   (f) S then executes a general k-shuffle (with $k = N_{cast}$) on each of the 2d intermediate sequences, using the secret parameters c and $\pi_1$, and reusing the same simple k-shuffle as the basis for each general k-shuffle. (This ensures that each of the 2d sequences are subjected to the same secret "permutation".)
   (g) (i) S repeats step (d) with new random $\beta$'s.
      (ii) raising each coordinate of each vote to the 1/c power and providing a Chaum-Pedersen proof of this operation, thus keeping c secret while convincing verifiers, by simply reversing roles of g and $C = g^c$.
   (h) (Note that S need not explicitly compute the intermediate sequences at this stage. They are necessary for external verification later, but the output can be computed directly and the intermediate sequences constructed on request of an auditor. However, security concerns may dictate that the auditor perform the verifications before beginning the next shuffle.)

3. Shuffled ballots are now reconstructed by combining entries of each of the 2d sequences in the same way they were formed.

4. Finally, t authorities execute the threshold decryption protocol on each shuffled ballot.

In general, the tabulation phase includes two subphases. First, a set of $T \leq t$ of the tabulation authorities each execute, in sequence, a verifiable k×d shuffle (where k is the total number of ballots cast). The output sequence and proofs from each shuffle is signed and passed to the next tabulation authority. (Each tabulation authority executes its shuffle only if the input passes both a signature check and a check of the (previous) shuffle zero-knowledge proof ("ZKP") and the intermediate Chaum-Pedersen proofs.) Second, once the full round of shuffles have been executed and verified, a set of t tabulation authorities use their secret key shares to jointly (and verifiably) compute a decryption of each m's in the final set of ElGamal pairs.

In general, each shuffling authority will know the input-output correspondence, since it is responsible for generating the permutation in the first place. However, shuffles are staged. Thus the output of one shuffle is used as the input to another shuffle performed by a different shuffling authority. Thus, unless all authorities conspire, no one shuffling authority will have any knowledge of the correspondence between initial input and final output. As described below, however, a further enhancement eliminates this possibility.

Fourth: Externally Verify Election

On request, each authority publishes
   (a) His intermediate sequences.
   (b) Chaum-Pedersen proofs $P(g, g_s(j, l), h, h_s(j, l))$ for $1 \leq j \leq N_{cast}$ and $1 \leq l \leq d$.
   (c) His k-shuffle proof.
   (d) The Chaum-Pedersen proofs under step (g) above.

In general, an election transcript may be published that contains the following:
1. The voter roll containing voter identification information and voter public keys.
2. The original set of k voter-signed ballots.
3. The tk×d shuffles (including proofs, as noted above).
4. The final share decryption validity proofs.
5. The final tallies.

Remark: Several variations on the order in which the authorities execute their tabulation steps (Tabulation steps 2(a)–(h) above) are possible. In particular, the steps can be interleaved under alternative embodiments.

Remark: The External Verification phase can be carried out as tabulation is going on, or at a later time. The authorities need only save their stage parameters.

Figure 2:
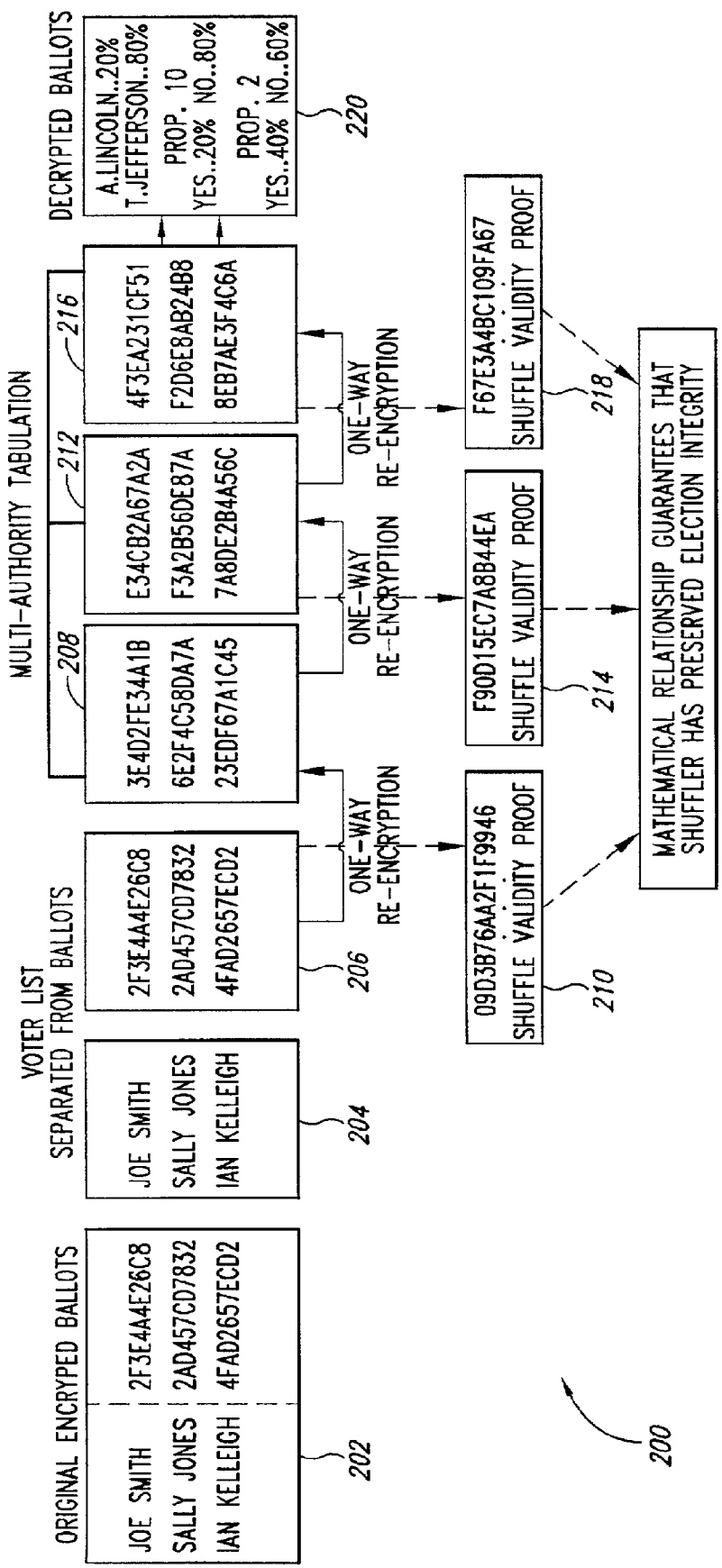
FIG. 2 is a schematic diagram illustrating a simple implementation of the shuffle protocol described herein as applied to a simple ballot with three voters and three shuffles.

Referring to FIG. 2, a schematic diagram illustrates a basic application of the shuffle protocol to an election, shown as a method 200. In block 202, three encrypted ballots are submitted, one each for voters Joe Smith, Sally Jones, and Ian Kelleigh. In block 204, the list or roll of voters is separated from the encrypted ballots, which are shown in block 206. Thereafter, a one-way reencryption of the ballots is performed to produce a shuffled set of ballots, shown in block 208. A shuffle validity proof is generated based on this first shuffle, shown in block 210. The shuffle validity proof allows a third party to ensure that all input data (the ballots) had the same operation applied to them, and that no altering of the ballots had been performed.

A second shuffle of the (previously shuffled) ballots is performed, to generate a second shuffled set of ballots, shown as block 212. Again, a shuffle validity proof is generated, shown in block 214. The shuffled ballots of block 212 are shuffled a third time, to produce a final shuffled set of ballots under block 216. A third validity proof 218 is likewise generated based on the third shuffle. In sum, a three-by-three shuffle array is provided under this example. Following, the shuffling, the ballots are decrypted to produce a tally, shown as block 220. A third party may verify that the election by analyzing, among other things, each shuffle validity proof to ensure that each shuffler has preserved election integrity.

The shuffle protocol is presented above as effectively separate subroutines that may be employed for various applications, such as in a electronic voting scheme. A first subroutine provides the functionality of scaled, iterated, logarithmic multiplication proofs between a prover and a verifier. A second subroutine provides the functionality of a simple shuffle protocol and employs the scaled, iterated, logarithmic multiplication proofs. Thereafter, a third subroutine implements general shuffle functionality, where the shuffler does not know the exponents, building upon the second subroutine of the simple shuffle. A fourth subroutine extends the third subroutine to shuffling k tuples of elements.

Figure 3:
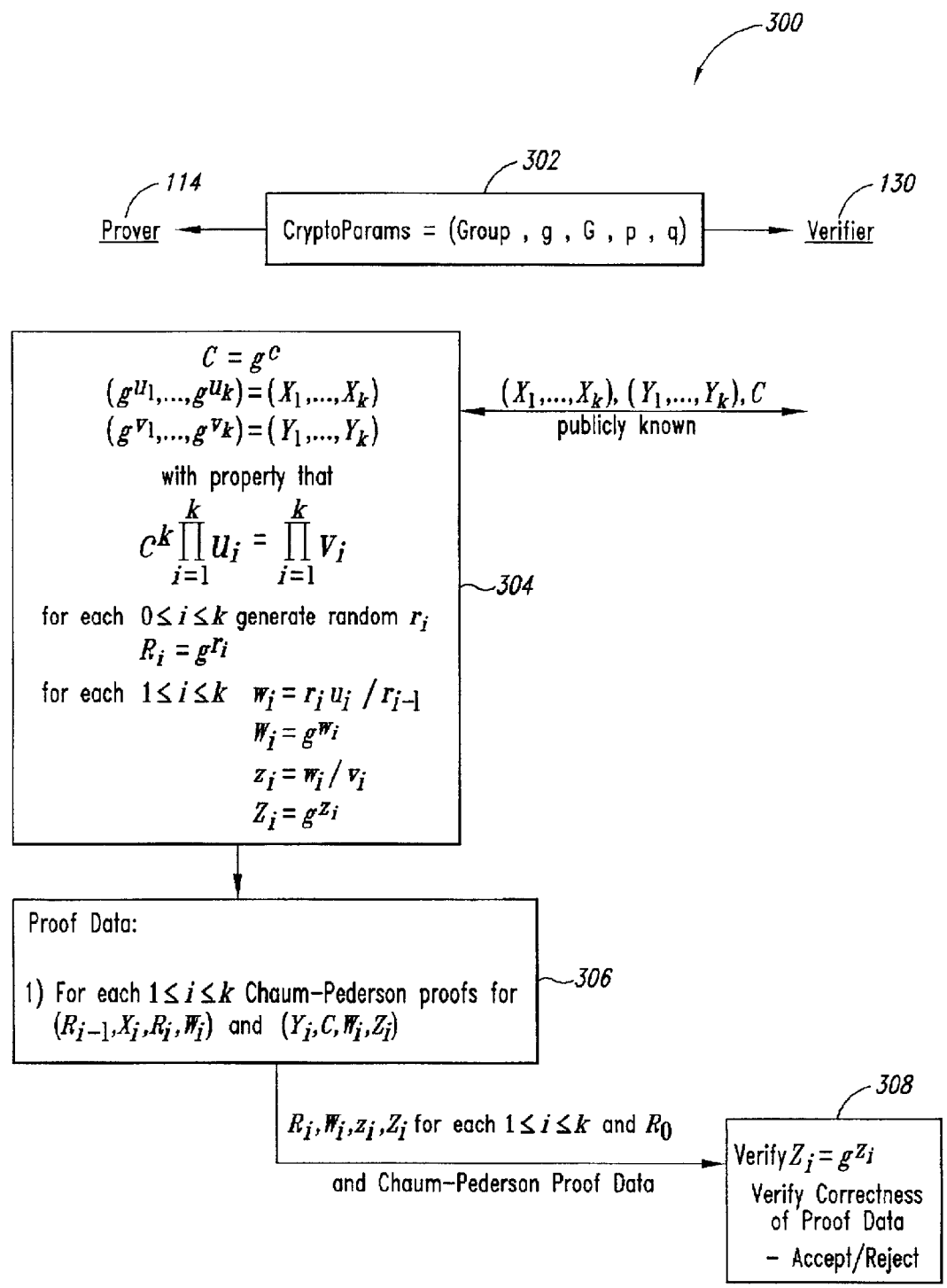
FIG. 3 is a flow diagram illustrating a scaled iterative logarithmic multiplication proof protocol.

Referring to FIG. 3, a routine 300 is shown for implementing scaled, iterated, logarithmic multiplication proofs. In block 302, initial cryptographic parameters are agreed upon, such as by a voting organization. These initial parameters include the group (e.g., $Z_p$), a subgroup operator g, the size of the group G, and the size of the generated subgroups p and q. This information may be provided to a number n of shuffler or authority computers 114 and verifier computers 130.

In block 304, the shuffler (or Prover P) selects a secret exponent c, and based on the subgroup generator g generates C. Additionally, the shuffler may receive or generate Y values for received X's and, for indexes of i for 1 through k, and provides the X's, Y's, and C to the verifier.

In block 304, the shuffler also secretly generates random exponents as $r_i$, which, based on the subgroup generator g, are used to generate values $R_i$ for each value of i of 0 through k. Similarly, under block 304, the shuffler employs the generated random exponent $r_i$ to generate $W_i$ and $Z_i$.

In block 306, the shuffler provides Chaum-Pedersen proofs for each element 1 through k for the values of $R_{i-1}$, $X_i$, $R_i$, $W_i$, and $Y_i$, C, $W_i$, $Z_i$. These values for the Chaum-Pedersen proofs are then provided to the verifier, together with values $z_i$ and $R_0$. The verifier then, in block 308, verifies the correctness of the proof data to accept or reject the proof. In other words, the verifier checks that each z, as an exponent to the subgroup generator g, generates a corresponding Z, checks each Chaum-Pedersen proof, checks that the product of the $z_i$'s is equal to z, and that the value $R_0$ raised to the power z is equal to $R_k$.

Figure 4:
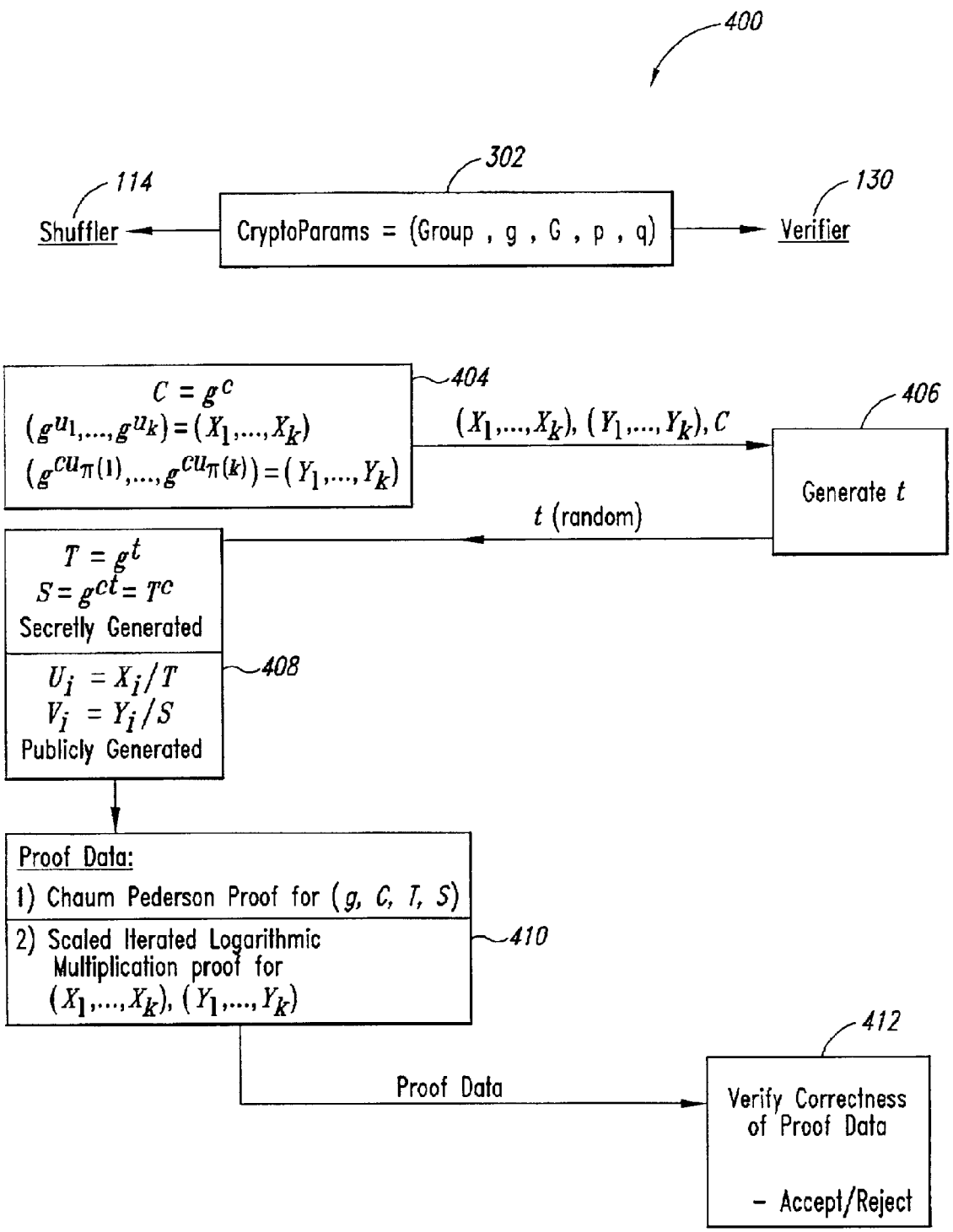
FIG. 4 is a flow diagram illustrating a simple shuffle protocol where the shuffler knows the encryption exponent.

Referring to FIG. 4, a routine 400 is shown for performing a simple shuffle protocol, as described above. Following block 302, the block 404 is similar to block 304, but the shuffler shuffles the X elements by a permutation $\pi$ to generate the Y elements. The verifier in block 406 generates a random value t as a challenge. In response, the shuffler in block 408 uses t as an exponent to the subgroup generator g to secretly generate the value T, which, when combined with the shuffler's secret exponent c, permits the shuffler to secretly generates a value S. As shown, the shuffler then publicly generates values U and V and provides a Chaum-Pedersen proof for (g, C, T, S) under block 410. In block 410, the shuffler also generates proof data as scaled iterated logarithmic multiplication proof for each of the elements X and Y in the series of i of 1 through k. The proof data is then provided to the verifier in block 412. The verifier verifies the correctness of the proof data and accepts or rejects it. In other words, the verifier executes the scaled iterated logarithmic multiplication proof protocol noted above for the sequences of U and V, and checks the commitment value C.

Figure 5:
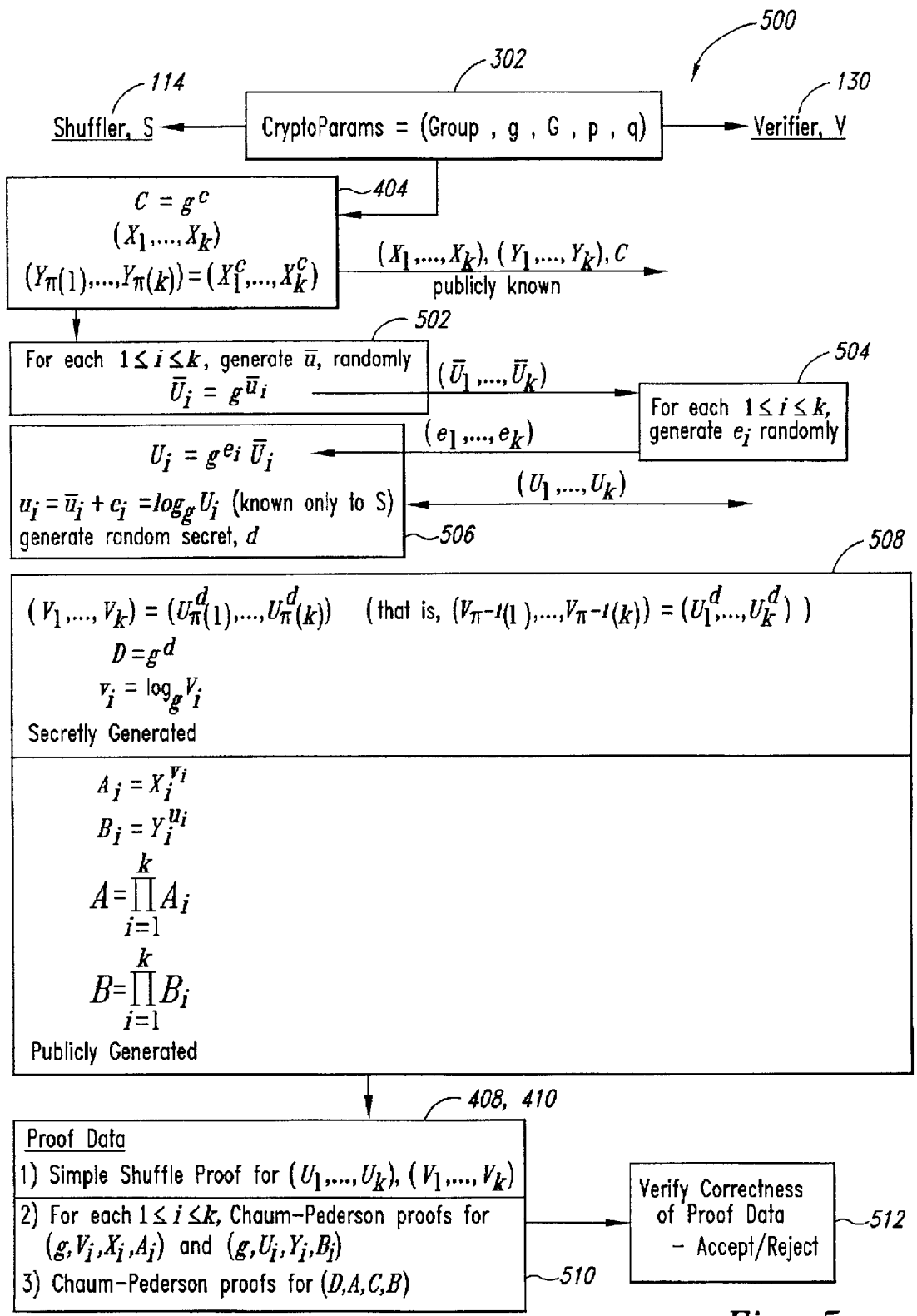
FIG. 5 is a flow diagram illustrating a general shuffle protocol where the shuffler does not know the encryption exponents.

Referring to FIG. 5, a general shuffle protocol 500 is shown where the shuffler does not know the exponents. The initial steps in the protocol 500 are similar to that of 400, except that the verifier adds a randomizing element to the shuffler's secret exponents. As shown in block 502, the shuffler secretly generates a random sequence of initial values, which are used as exponents with the subgroup generator g to generate an initial sequence ($\overline{U}_i = g^{\overline{u}_i}$). Likewise, in block 504, the verifier secretly generates another sequence of elements e for values i of 1 through k, and provides the sequence to the shuffler as a challenge. In block 506, the shuffler secretly adds the sequence challenge e to the previous sequence, to then publicly generates a series of values U ($U_i = g^{e_i} \overline{U}_1$).

In block 508, the shuffler constructs a simple k shuffle on the sequence U with another secretly generated commitment D (that employs a different secret exponent d chosen by the shuffler) and generates a sequence of values V. Then publicly, the shuffler reveals Chaum-Pedersen proofs for a sequence of values A and B for indexes 1 through k, publicly generates the product of the sequences as values A and B, and provides a Chaum-Pedersen proof for the relation between D, A, C and B, as shown. Under block 510, this proof data is provided to the verifier, who verifies it under block 512.

10. Issuing Anonymous Certificates with Verifiable Shuffles

Presented above is a new, efficient construction for verifiably shuffling encrypted data, and a particular way that this construction can be used to conduct a universally verifiable electronic election system. That system depends on a collection of election authorities to "shuffle," or "anonymize" the ballot data that has been collected at vote time. This process takes place after all votes have been cast, but before ballots are decrypted and tabulated. The validity construction prevents any one or more of the election authorities from making any changes to the original election data without being discovered by anyone auditing the final election transcript.

A disadvantage with this approach is that voter anonymity is not protected by as strong a mechanism as is election integrity. Election integrity is protected by pure computational intractibility—it is essentially impossible for the election authorities to produce false election results without detection—even if they all act in collusion. However, by acting in collusion, they are able to determine the contents of any individual voter's ballot with relative ease.

The same underlying shuffle construction can be used to construct a new election protocol that eliminates this weakness. The idea is to move the shuffling to the registration, or ballot request phase of the election, thereby anonymizing the identities of the voters without losing strict control, and audit of election eligibility rules—i.e., only ballots cast by registered voters should be counted, and multiple ballots from the same voter should not be accepted. With this accomplished, it is no longer even necessary to encrypt ballots, and tabulation can be performed "in the clear"—which is obviously an easy process to audit.

The idea of using the construction as part of an anonymous registration process has applications beyond voting. Any situation where access to a resource, such as a server or file, needs to be limited to authorized personnel, but where those who are authorized wish to protect their individual identity, may use this construction to meet both requirements simultaneously. For example, applications of group signatures may be equally applicable to the protocols described herein. Note also that the term "voter" is generally used herein to refer to any individual or organization that employs some or all of the protocols described herein.

Outline of the Protocols

Two protocol variants are provided, both of which follow the same high level flow of information. Each protocol begins with the assumption that a set of public keys has been stored in some central authentication database, or certificate server. Each corresponding private key is known by one, and only one, eligible voter. Furthermore, the correspondence between public key and individual voter is known by the entity, or entities, who control the certificate server. (The exact form of these public/private key pairs are slightly different in each variant of the protocol.) In practice, the public keys will likely be wrapped in the form of a digital certificate which ties all identifying information together with the public key in a single piece of formatted data. (This is the convention followed by widely accepted Public Key Infrastructures, or PKI's.)

Typically, this distribution of keys and certificates will be accomplished by a tightly controlled registration process, the most secure of which would be an "in person" registration process where the voters can be physically identified at the time of certificate generation. (Such registration processes are described in detail in U.S. patent application Ser. No. 09/534,836 noted above.) It is important to distinguish between two different types of certificates that exist in the protocols. The first type are the certificates just described, where the association between public key and individual person is publicly, or at least widely known ("standard certificates"). The second type are the certificates that will be distributed in the stages of the protocol that follow the initial registration phase just described ("anonymous certificates"). These anonymous certificates are distinguishable from each other, at very least by the fact that they contain different public keys, however, the only individual who knows the owner of a given anonymous certificate is the owner himself. It is the goal of the protocol to guarantee that Only individuals who own one of the standard certificates are issued an anonymous certificate.

In most applications, such as the voting application, it is also the goal of the protocol to guarantee that Each individual is issued only as many anonymous certificates as he/she has standard certificates. (Usually, each owner of a standard certificate will have only one standard certificate.)

Once the registration of standard certificates is complete, the protocol variants each proceed as follows.

Initialization: A set, K, of raw public keys is constructed at the certificate server (e.g., server 108), and initially set to be the set of public keys associated with the set of standard certificates. The set of public keys is generated during the initial registration process of each individual, when that individual registers and receives, for example, a standard digital certificate. The public keys generated under the initial registration process are pooled together to generate the set K. Each individual holds a private key associated with one of the public keys in the set K.

1. An individual, P, contacts the certificate server, S, through a digital communication channel (such as the Internet) indicating that he wishes to obtain an anonymous certificate.
2. S returns to P a set, $H \subset K$, of public keys (which includes S's public key), and stores the set $J=K-H$. (Ideally, $H=K$ and $J=0$, but for reasons of communication bandwidth, the inclusion may be proper. For example, a subset of the public keys K may be provided to the individual P where the set of public keys is quite large, and bandwidth constraints for transmission effectively limit transmission of such a large set of keys. For other reasons, the certificate server may wish to return only a subset of the public keys.)
3. P selects a subset $M \subset H$, which may be all of H, and sets $$M'=H-M$$

4. P computes H' which is a shuffle transformation of M. (See above and the following sections.) P also generates a formatted anonymous certificate request. This is done by generating a random public/private key pair, and formatting the public part with some "random ID" data to conform to a specified certificate format. (Needless to say, P must also store the private part in some safe place.)
5. P returns H', M and M' to S along with
   (a) The shuffle transcript, or validity proof, which proves to S, or any auditor, that H' is, in fact, a valid shuffle transformation of M.
   (b) A proof that P knows the private key corresponding to a particular element, $h \in H'$.
   (c) The formatted certificate request.
6. S checks that $H=M \cup M'$ along with the validity of both 5a and 5b.
   (a) If any of the checks fail, S indicates failure to P and either terminates the communication with P, or gives P an appropriate chance to retry.
   (b) If both checks pass, then
      i. If anonymous certificates are intended to be issued only once to each owner of a standard certificate, S sets $$H''=H'-\{h\} \qquad (17)$$

$$K=J \cup M' \cup H'' \qquad (18)$$

or, if for some reason, it is desired to issue anonymous certificates multiple times to each owner of a standard certificate, S sets $$K=J \cup M' \cup H' \qquad (19)$$

ii. And, S digitally signs the formatted certificate request—thereby creating an anonymous certificate—returns the (signed) certificate to P, and stores the certificate in the data base for later anonymous authentication.
7. The process now continues from the beginning with a new P, and K appropriately modified.

In other words, the individual P may prove to the certificate server S that the individual holds a private key associated with one of the public keys in the subset M selected by the individual, without revealing which one by shuffling the subset M of public keys. After issuing an anonymous certificate, the certification server then removes the one shuffled public key from the shuffled set of public keys for use by the next individual requesting an anonymous certificate.

Anonymous Authentication and Signatures

The basic construction of the shuffle protocol above solves the following problem.

General k-Shuffle Problem: Two sequences of k elements of $Z_p$, $S=\{X_1, \ldots, X_k\}$, and $T=\{Y_1, \ldots, Y_k\}$ are publicly known. In addition, a constant $c \in Z_q$ is known only to P, but a commitment of c, $C=g^c$ is made known to V. P is required to convince V that there is some permutation, $\pi \in \Sigma_k$, with the property that $$Y_{\pi(i)}=X_i^c \qquad (20)$$

for all $1 \leq i \leq k$ without revealing any information about $\pi$ or the secret c.

In the shuffle protocol above the solution to this problem is first presented as an interactive proof protocol executed by P and V, but it is made non-interactive by standard application of the Fiat-Shamir heuristic. We denote the resulting verification transcript, produced by the shuffler, P, by T (S, T, g, C).

Anonymous Authentication Protocol 1

In this variant of the protocol

The public keys are elements $h \in \langle g \rangle \subset Z_p$, and the corresponding private keys are simply the secret exponents, $s=\log_g h$.

The set H must always be taken to be all of K, i.e. H=K.
The set M must also always be all of H, i.e. M=H and M'=0.

S must store one additional modular integer, G∈<g>, which will be modified during each authentication session. At initialization, G is set equal to g.

The protocol proceeds as described in the previous section, with the following modifications.

1. In step 2, S must also return G to P.
2. The transcript that is returned to P in step 5a is exactly $$T(M, H',G,C)=T(H,H',G,C) \tag{21}$$

3. The proof of private key knowledge in step 5b, is exactly the integer $e=cs \in Z_q$, along with the particular value h'∈H' (or its index) which satisfies $$h'=G^s \tag{22}$$

Note that there will be one, and only one, such value. Further note that since c is random and independent of s, revealing e does not reveal information about s. The corresponding check that S performs is simply to verify equation 22.

4. If the checks in equation 22 all pass, then in addition to the transformations performed in 1 and 2, S also performs the transformation $$G=C \tag{23}$$

Anonymous Authentication Protocol 2

A shortcoming of the first anonymous authentication protocol is that the set to be shuffled by P must always be all of K. The same transformation (exponentiation) is applied to all public keys in the set H=K. Since each of the transcripts T(H,H',G,C), must be stored until all audit requirements are fulfilled, this can create a large amount of data if the original set of standard certificates is large. This problem is addressed with the following second anonymous authentication protocol.

In this variant of the protocol

The public keys are pairs of elements (k,h)∈<g>×<g>, and the corresponding private keys are simply the secret exponents, $s=\log_k h$.

The set H must contain P's public key. This can be achieved in a variety of ways.
1. S and P can engage in a series of retries until this property of H is achieved.
2. or, at initial registration, standard certificates can be assigned to "blocks." When P first contacts S, he identifies himself only so far as his block number.

Effectively, a different base G is set for each individual P, and the individual shuffles only a subset of the entire set of public keys (which subset includes the voter's public private key pair). The protocol proceeds as described in the previous section, with the following modifications.

1. The transcript that is returned to P in step 5a is the shuffle transcript for the set of pairs. See above for the details of this construction.
2. The proof of private key knowledge in step 5b, needs to be a bit more complicated in order to avoid revealing the private key.
   (a) P must indicate to S a particular pair, (k',h')∈H', or its index, which is the new index of the pair belonging to P's private key. That is, $h'=(k')^s$. (Notice that such a pair exists uniquely since the shuffle operation exponentiates both the k's and the h's to the same secret exponent c. So $h=k^s$ if, and only if, $h^c=(k^c)^s$.)
   (b) P reveals to S a "zero-knowledge proof" that he, P, knows $s=\log_g h'$. (See the Chaum articles.) This proves that P knows the corresponding private key without revealing it.

3. The corresponding checks that S must perform are obvious.
   (a) S checks the validity of P's shuffle transcript.
   (b) S checks the validity of P's proof that he knows that $s=\log_g h'$.

Note: under an alternative embodiment, some or all of the keys in the set K (i.e., the subset H) may be shuffled by certain individuals or authorities before any one individual requests an anonymous certificate. In other words the pool of public keys may be sufficiently randomized before either of the above anonymous authentication protocols are employed for a particular requesting individual. As a result, a smaller subset of public keys may be selected by each individual under Protocol 2.

Figure 6:
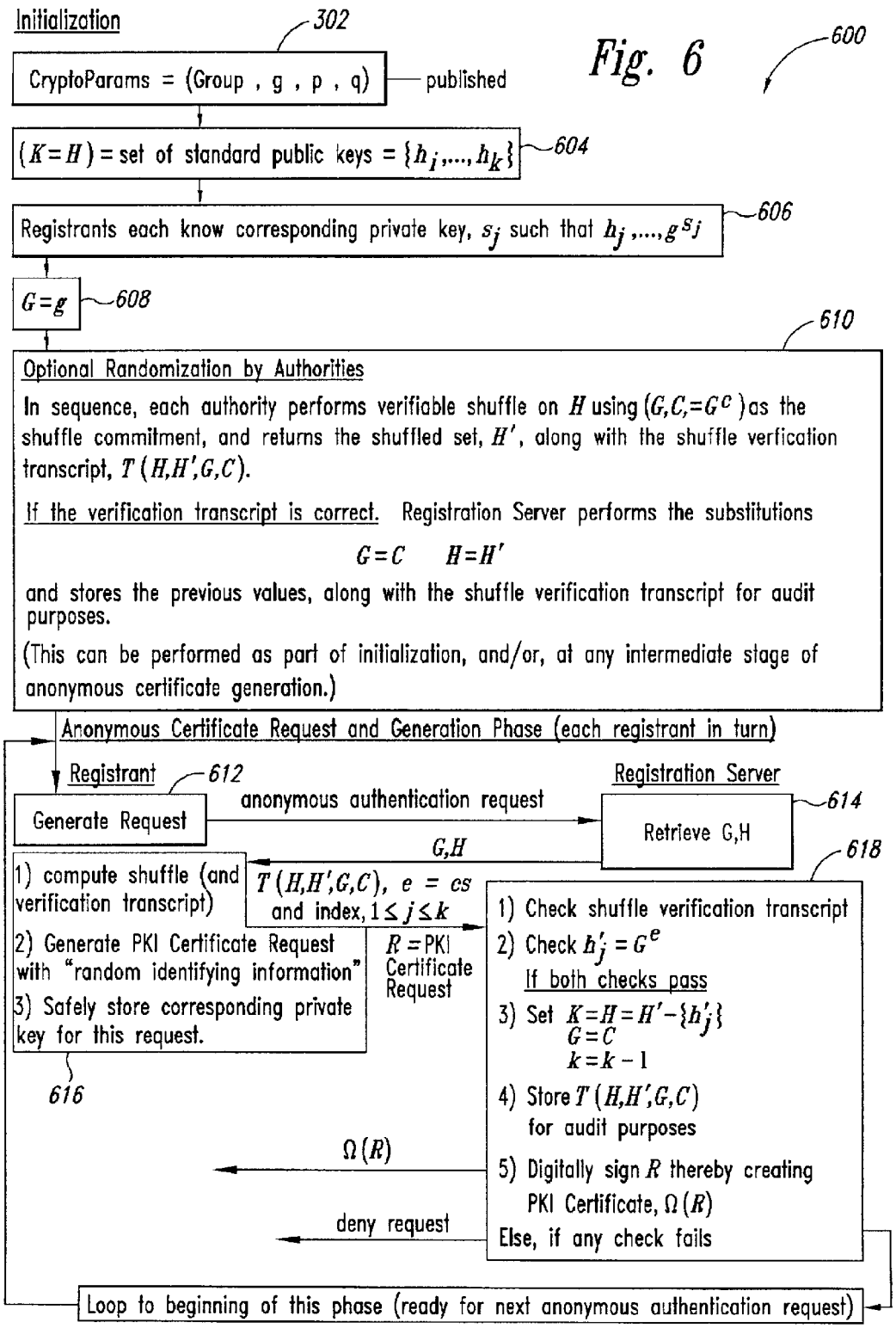
FIG. 6 is a flow diagram illustrating an anonymous certificate distribution routine.

Referring to FIG. 6, an example of a routine 600 for implementing the first variant of the anonymous certificate distribution is shown. After initializing cryptographic parameters in block 302, a standard set of public keys H are provided in block 604, which may be collected by a registration server after a set of registrants or voters have each registered and submitted public keys h (that correspond to individually held private keys s, as shown in block 606). In block 608, the subgroup generator g is set to G.

In block 610, an optional randomization performed by one or more authorities may be performed. Under block 610, in sequence, each authority performs a verifiable shuffle on the set of standard public keys H using (G, C=G$^c$) as a shuffle commitment, where c is a secret key held by the authority. Each authority returns the shuffled set of public keys, H', along with shuffle verification transcript, T(H,H', G,C) by employing the general shuffle described above. If the verification transcript is correct, then the registration server performs the substitutions G=C and H=H', and stores the previous values, along with the shuffle verification transcript for later auditing purposes. The optional randomization under block 610 may be performed as part of the previous initialization, or at any intermediate stage of anonymous certificate generation described below.

Blocks 612–618 represent a single request for an anonymous certificate by an individual who previously provided one of the public keys h in the set H. These steps are repeated for each requesting registrant. In block 612, the registrant (or more accurately, the voter's computer 102) generates a request for an anonymous certificate. In response thereto, the registration server retrieves the value G, and the set of public keys H under blocks 614 and returns them to the registrant. In block 616, the registrant computes a shuffle and corresponding verification transcript under the general shuffle protocol described above and returns T (H, H', G, C) and e (which is equal to cs, known only to the registrant), for each index 1≤j≤k. Additionally, in block 616, the registrant generates a PKI certificate request with certain random identifying information. The random identifying information may be any user ID the registrant chooses to employ that cannot be used to identify the registrant. Under block 616, the registrant also safely stores a corresponding private key based on this request (which differs from the private key $s_j$).

In block 618, the registration server checks the shuffle verification transcript and checks that $h'_j=G^e$. If both of these checks pass, then the registration server sets H=H' minus the one public key used by the registrant for certification ($h'_j$), G=C and k=k−1. For auditing purposes, the registration server in block 618 also stores the registrant's verification transcript (i.e., T(H, H', G, C)). The registration server also digitally signs the certificate request R to create a PKI certificate that is returned to the registrant. The routine then is ready for the next registrant's request.

Figure 7:
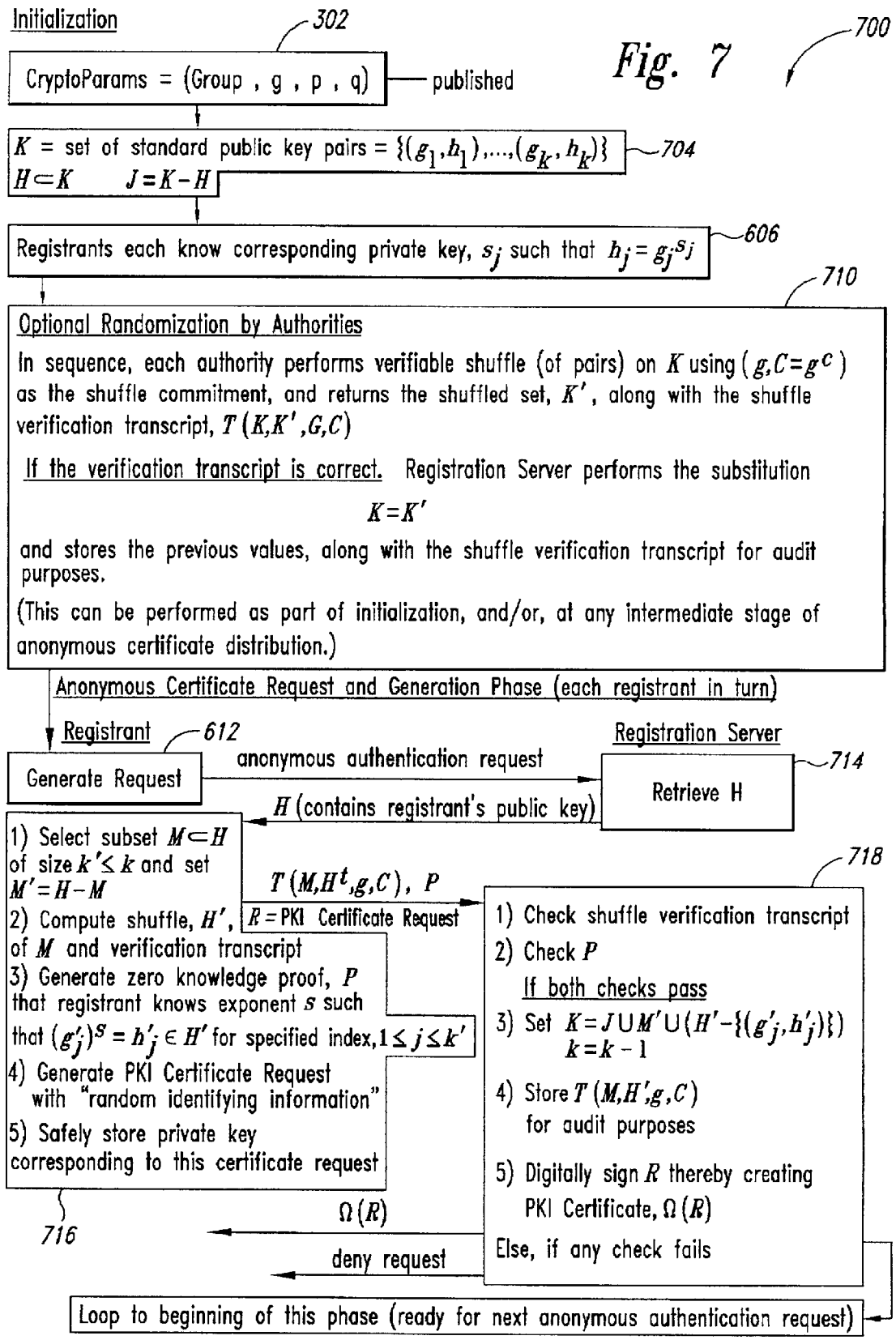
FIG. 7 is a flow diagram illustrating an alternative embodiment to the anonymous certificate distribution routine of FIG. 6.

Referring to FIG. 7, a routine 700 shows the second variant described above for anonymous certificate distribution. The routine 700 is similar to the routine 600. Block 704 is similar to block 604, except that the set H includes public/private key pairs, and may be a proper subset. Similarly, block 710 is similar to block 610, as shown in FIG. 7.

After receiving a request, the registration server in block 714 retrieves a set H of public key pairs. Under an alternative embodiment, the registration server retrieves only a subset that includes the registrant's public key. In block 716, the registrant selects a subset of the public key pairs M and sets M'=H−M. The registrant computes a shuffle H' of M and a corresponding verification transcript (T (M, H', g, C)), and generates a zero-knowledge proof, P that the registrant knows a secret exponent s as shown in FIG. 7. Additionally, the registrant generates PKI certificate request with random identifying information and stores the private key, as described above.

In block 718, the registration server checks the shuffle verification transcript and P. If both checks pass, then the registration server sets K (with the public key pair ($g'_j$, $h'_j$) removed under equations (18) or (19)) and sets k=k−1. The remainder of routine 700 is substantially similar to that of routine 600.

11. Conclusion

One skilled in the art will appreciate that the concepts of the invention can be used in various environments other than the Internet. For example, the concepts can be used in an electronic mail environment in which electronic mail ballots, transactions, or forms are processed and stored. In general, a web page or display description (e.g., the bulletin board) may be in HTML, XML or WAP format, email format, or any other format suitable for displaying information (including character/code based formats, bitmapped formats and vector based formats). Also, various communication channels, such as local area networks, wide area networks, or point-to-point dial-up connections, may be used instead of the Internet. The various transactions may also be conducted within a single computer environment, rather than in a client/server environment. Each voter or client computer may comprise any combination of hardware or software that interacts with the server computer or system. These client systems may include television-based systems, Internet appliances and various other consumer products through which transactions can be performed.

In general, as used herein, a "link" refers to any resource locator identifying a resource on the network, such as a display description of a voting authority having a site or node on the network. In general, while hardware platforms, such as voter computers, terminals and servers, are described herein, aspects of the invention are equally applicable to nodes on the network having corresponding resource locators to identify such nodes.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein", "hereunder", and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other encryption applications, not only the electronic voting system described above. For example, the protocol has applications in electronic commerce where both anonymity and auditability are requirements. Examples of this are electronic payment schemes ("e-cash").

The various embodiments described above can be combined to provide further embodiments. All of the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all encryption systems and methods that operate under the claims to provide data security. Accordingly, the invention is not limited by the disclosure, but instead the scope of the invention is to be determined entirely by the claims.

While certain aspects of the invention are presented below in certain claim forms, the inventor contemplates the various aspects of the invention in any number of claim forms. For example, while only one aspect of the invention is recited as embodied in a computer-readable medium, other aspects may likewise be embodied in computer-readable medium. Accordingly, the inventor reserves the right to add additional claims after filing the application to pursue such additional claim forms for other aspects of the invention.

I claim:

1. An electronic voting system for use with a computerized network, comprising:

a plurality of voting computers coupled to the computerized network, wherein each voting computer provides an electronic encrypted ballot, wherein each electronic ballot is encrypted under a discrete log asymmetric encryption process using underlying groups $Z_p$ or elliptic curve;

at least first, second and third authority computers coupled to the computerized network, wherein the first authority computer is configured to receive a series of electronic ballots corresponding to an aggregation of each of the electronic ballots received from the plurality of voting computers, and to apply a secret, one-way cryptographic transformation using at least a first secret key to anonymously shuffle the series of electronic ballots and produce a first shuffled series of ballots, wherein only the first authority computer knows a correspondence between the first series of shuffled ballots and the series of electronic ballots, and wherein the first authority computer is further configured to provide a first non-interactive proof of correctness for the first series of shuffled ballots based on a scaled iterated logarithmic multiplication proof;

wherein the second authority computer is configured to receive the first series of shuffled ballots, to apply the cryptographic transformation using at least a second secret key to anonymously shuffle the first series of shuffled ballots and produce a second series of shuffled ballots, wherein only the second authority computer knows a correspondence between the first series of shuffled ballots and the second series of shuffled ballots, and wherein the second authority computer is further configured to provide a second non-interactive proof of correctness for the second series of shuffled ballots based on the scaled iterated logarithmic multiplication proof;

wherein the third authority computer is configured to receive the second series of shuffled ballots, to apply the cryptographic transformation using at least a third secret key to anonymously shuffle the second series of shuffled ballots and produce a third series of shuffled ballots, wherein only the third authority computer knows a correspondence between the third series of shuffled ballots and the second series of shuffled ballots, and wherein the third authority computer is further configured to provide a third non-interactive proof of correctness for the third series of shuffled ballots based on the scaled iterated logarithmic multiplication proof; and a verification computer coupled to the computerized network, wherein the verification computer is configured to receive the proofs of correctness from the first, second and third authority computers and without interacting with the first, second and third authority computers, to verify a correctness of the shuffled ballots.

2. The system of claim 1, further comprising:

a server computer system coupled to the computerized network, wherein the server computer system is configured to: receive the plurality of electronic ballots from the plurality of voting computers; verify a proof of validity of each of the plurality of electronic ballots; form an encrypted tally of the votes from the plurality of electronic ballots; transmit the encrypted tally to the first, second and third authority computers; receive ballot decryption shares produced from at least two of the first, second and third authority computers; and compute a decrypted tally; and at least one voting poll computer coupled to the computerized network and providing some of the plurality of electronic encrypted ballots to the server computer system.

3. The system of claim 1 wherein the first, second and third authority computers are configured to provide Chaum-Pedersen proofs for the first, second and third shuffles of the ballots, respectively, and wherein each of the first, second and third authority computers generate an initial challenge series, receive a challenge from at least one verification computer, and generate the cryptographic transformation based on an exponentiation of the initial and received challenges.

4. The system of claim 1 wherein the computerized network includes the World Wide Web, wherein each of the plurality of voting computers and first, second and third authority computers include a web browser program.

5. The system of claim 1 wherein the plurality of voter computers include at least one palm-sized computer, cell phone, wearable computer, interactive television terminal or Internet appliance.

6. A computer system for receiving a sequence of elements, comprising:

a server computer coupled to a computer network and configured to:
receive a sequence of electronic data elements representing individual data files,
apply a cryptographic transformation using at least a first secret key to anonymously permute the sequence of electronic data elements and produce a first shuffled sequence of electronic data elements, wherein the server computer knows a correspondence between the first shuffled sequence of electronic data elements and the sequence of electronic data elements, and
generate a first proof of correctness for the first shuffled sequence of electronic data elements based on a scaled iterated logarithmic multiplication proof.

7. The system of claim 6 wherein the received sequence of electronic data elements are encrypted using $Z_p$ or elliptic curve groups using a key unknown to the server computer, and wherein the server computer is further configured to:

receive a series of randomly generated values $e_i$ from a verifier computer;

secretly generate a series of values $U_i$ based on a secret, one-way cryptographic transformation that employs the received series of values $e_i$ and secretly generated values $\bar{u}_i$ permute the sequence of electronic data elements to produce the first shuffled sequence of elements based on the series of values $U_i$ and a secret value d; and provide the values $U_i$ and a series of proof values based on the cryptographic transformation as a proof of knowledge that the server computer has access to how the cryptographic transformation permuted the sequence of electronic data elements to produce the first shuffled sequence of elements without revealing the cryptographic transformation to the verifier computer.

8. The system of claim 6 wherein the server computer is further configured for:

receiving a plurality of public keys from a corresponding plurality of individuals, wherein each of the plurality of individuals have a private key corresponding to one of the plurality of public keys;

receiving a request for a certificate from one of the plurality of individuals having a one private key;

providing at least a subset of the plurality of public keys to the requesting individual;

receiving a shuffle of the plurality of public keys and a linear size proof of correctness for the shuffled public keys based on a scaled iterated logarithmic multiplication proof and a value corresponding to the one private key, wherein the value provides proof that the one individual has knowledge of the one private key without revealing the one private key;

checking the proof of correctness;

checking that the value is mathematically related to a one of the public keys that corresponds to the one private key;

issuing a certificate to the one individual; and reducing the plurality of public keys by the one public key.

9. The system of claim 6 wherein the sequence of electronic elements are public keys, and wherein the server if further configured to check, in response to a request from an individual, that the individual has a value uniquely and mathematically related to a one of the public keys; and if so, issue a certificate to the one individual.

10. A computer-implemented method, comprising:
receiving a plurality of public keys from a corresponding plurality of individuals, wherein each of the plurality of individuals have a private key corresponding to one of the plurality of public keys;
receiving a request for a certificate from one of the plurality of individuals having a one private key;
providing at least a subset of the plurality of public keys to the requesting individual;
receiving a shuffle of the plurality of public keys and a proof of correctness for the shuffled public keys based on a scaled iterated logarithmic multiplication proof and a value corresponding to the one private key, wherein the value provides proof that the one individual has knowledge of the one private key without revealing the one private key;
checking the proof of correctness;
checking that the value is mathematically related to a one of the public keys that corresponds to the one private key;
issuing a certificate to the one individual; and
reducing the plurality of public keys by the one public key.

11. The method of claim 10 wherein the method further includes setting a value G to a subgroup operator g from an $Z_p$ or elliptic curve group, wherein providing at least a subset of the plurality of public keys includes providing all of the then current public keys H.

12. The method of claim 10 wherein providing at least a subset of the plurality of public keys includes providing at least a subset of a plurality of public key pairs, wherein receiving a shuffle of the plurality of public keys includes receiving a shuffle of a true subset of the plurality of public key pairs as selected by the one individual.

13. The method of claim 10, further comprising:
receiving from each of a plurality of authorities, in sequence, a shuffled set of the plurality of public keys H' based on a secret cryptographic shuffle operation performed on at least a subset of the plurality of public keys to produce the shuffled set of the plurality of public keys H';
receiving from each of a plurality of authorities, in sequence, a verification transcript of the cryptographic shuffle operation; and
verifying a correctness of the cryptographic shuffle operation based on the verification transcript; and if verified, then setting at least a subset of the plurality of public keys to H to H'.

14. The method of claim 10, further comprising:
at a time after receiving at least some of the plurality of public keys, setting at least a subset of the then received plurality of public keys to a received shuffled set of the plurality of public keys, wherein the shuffled set of the plurality of public keys have been received from a third party.

15. The method of claim 10, further comprising:
receiving the issued certificate from the one of the plurality of individuals; and
providing an electronic ballot to the one individual.

16. The method of claim 10 wherein issuing a certificate includes digitally signing the received request to produce a public key infrastructure ("PKI") certificate.

17. The method of claim 10, further comprising:
receiving issued certificates from at least some of the plurality of individuals and providing initial electronic ballots in response thereto; and
receiving unencrypted voted ballots from the at least some of the plurality of individuals.

18. A computer-implemented cryptographic method between a prover computer and a verifier computer with respect to first and second sequences of data elements, the method comprising:
selecting a subgroup generator g selected from a group G;
secretly generating a prover key c, and a commitment value C based on the subgroup generator g;
secretly establishing a cryptographic relationship between first and second sequences of elements, wherein the cryptographic relationship employs scaled iterated logarithmic multiplication;
providing to the verifier computer the commitment C and the first and second sequences of elements, but not the cryptographic relationship;
computing a series of proof values based on the cryptographic relationship; and
providing the series of computed proof values to the verifier computer as a non-interactive proof of knowledge that the prover computer has access to the cryptographic relationship without revealing the cryptographic relationship to the verifier computer.

19. The method of claim 18 wherein at least the second sequence of elements is a sequence of encrypted ballots, wherein each ballot is encrypted using $Z_p$ or elliptic curve groups;
wherein the first and second sequences of elements are respectively
$(X_1, \ldots, X_k)$ and $(Y_1, \ldots, Y_k)$
wherein the first and second sequence of elements have the cryptographic relationship
and wherein computing and providing the series of proof
$(g^{u_1}, \ldots, g^{u_k}) = (X_1, \ldots, X_k)$
$(g^{v_1}, \ldots, g^{v_k}) = (Y_1, \ldots, Y_k)$ and where $$c^k \prod_{i=1}^{k} u_1 = \prod_{i=1}^{k} v_1$$

values includes providing Chaum-Pedersen proofs based on:
for each $0 \leq i \leq k$ generate random $r_i$ $R_i = g^{r_i}$ for each $1 \leq i \leq k$ $w_i = r_i u_i / r_{i-1}$ $W_i = g^{w_i}$ $z_i = w_i / v_i$ $Z_i = g^{z_i}$ wherein the Chaum-Pedersen proofs provided to the verifier computer are of a form:
$(R_{i-1}, X_i, R_i, W_i)$ and $(Y_i, W_i, Z_i)$.

20. The method of claim 18, further comprising:
permuting the first sequence of elements to produce the second sequence of elements based on a cryptographic transformation;
receiving a randomly generated value t from the verifier computer;

secretly generating a value T based on the received value t and the subgroup generator, and secretly generating a value S based on the received value t and the prover key c; and wherein computing and providing to the verifier computer the series of proof values includes providing a series of values based on the cryptographic transformation as a proof of knowledge that the prover computer has access to how the cryptographic transformation permuted the first sequence of elements to produce the second sequence of elements without revealing the cryptographic transformation to the verifier computer.

21. The method of claim 18, further comprising:

permuting the first sequence of elements to produce the second sequence of elements based on a cryptographic transformation in a form of $(g^{u_1}, \ldots, g^{u_k})$ and $(X_1, \ldots, X_k)$ $(g^{cu_{\pi(1)}}, \ldots, g^{cu_{\pi(k)}}) = (Y_1, \ldots, Y_k)$ receiving a randomly generated value t from the verifier computer;

secretly generating a value T based on raising the subgroup generator g to the received value t, and secretly generating a value S based on raising the value T to the prover key c; and wherein computing and providing to the verifier computer the series of proof values includes providing a series of values based on the cryptographic transformation in a form of:

$U_i = X_i/T$ $V_i = Y_i/S$ as a proof of knowledge that the prover computer has access to how the cryptographic transformation permuted the first sequence of element to provide the second sequence of elements without revealing the cryptographic transformation to the verifier computer.

22. The method of claim 18, further comprising:

receiving the first sequence of elements as a set of elements that have previously been permuted in a manner unknown to the prover computer;

receiving a series of randomly generated values $e_i$ from the verifier computer;

secretly generating a series of values $U_i$ based on a secret cryptographic transformation that employs the received series of values $e_i$ and secretly generated values $\bar{u}_i$ permuting the second sequence of elements with respect to the first sequence of elements based on the series of values $U_i$ and a secret value d; and wherein computing and providing to the verifier computer the series of proof values includes providing the resulting values $U_i$ and providing a series of proof values based on the cryptographic transformation as a proof of knowledge that the prover computer has access to how the cryptographic transformation permuted the first sequence of element to provide the second sequence of elements without revealing the cryptographic transformation to the verifier computer.

23. The method of claim 18, further comprising:

receiving the first sequence of elements as a set of elements that have previously been permuted in a manner unknown to the prover computer;

receiving a series of randomly generated values $e_i$ from the verifier computer;

secretly generating a series of values $U_i$ based on a secret cryptographic transformation of a form $u_i = \bar{u}_i + e_i = \log_g U_i$ permuting the second sequence of elements with respect to the first sequence of elements based on the series of values $U_i$ and a secret value d based on the following operations $(V_1, \ldots, V_k) = (U_{\pi(1)}{}^d, \ldots, U_{\pi(k)}{}^d)$ $D = g^d$ $v_i = \log_g V_i$ $A_i = X_i^{v_i}$ $B_i = Y_i^{u_i}$ and wherein computing and providing to the verifier the series of proof values includes providing the resulting values $U_i$, $$A = \prod_{i=1}^{k} A_1$$

$$B = \prod_{i=1}^{k} B_1$$

and for $1 \leq i \leq k$, providing a series of proof Chaum-Pedersen of a form $(g, V_i, X_i, A_i)$ and $(g, U_i, Y_i, B_i)$ and a Chaum-Pedersen proof for (D, A, C, B) as a proof of knowledge that the prover computer has access to how the cryptographic transformation permuted the first sequence of element to provide the second sequence of elements without revealing the cryptographic transformation to the verifier computer.

24. The method of claim 23, further comprising repeating the receiving the first sequence of elements, receiving a series of randomly generated values, secretly generating a series of values, and permuting the second sequence of elements for l-tuple of elements in the first sequence of elements.

25. The method of claim 22 wherein receiving the first sequence of elements includes receiving a subset of a set of identifying elements, wherein each identifying element in the set corresponds to an individual, and wherein the method further comprises:

receiving an anonymous certificate if the verifying computer verifies the series of proofs.

26. The method of claim 18 wherein the group G is $z_p$.

27. The method of claim 18 wherein the group G is an elliptic curve group.

28. A computer-readable medium whose contents provide instructions, when implemented by a computer, perform a shuffling of a sequence of electronic data elements, comprising:

receive the sequence of electronic data elements;

apply a secret, one-way cryptographic transformation using at least a first secret key to anonymously permute the sequence of electronic data elements and produce a first shuffled sequence of electronic data elements; and generate a non-interactive proof of correctness for the first shuffled sequence of electronic data elements based on a scaled iterated logarithmic multiplication proof.

29. The computer-readable medium of claim 28 wherein the received sequence of electronic data elements are encrypted with an underlying mathematical group being a ring of integers having a modulus integer value p ($Z_p$).

30. The computer-readable medium of claim 28 wherein the computer-readable medium is a logical node in a computer network receiving the sequence of electronic data elements and the contents.

31. The computer-readable medium of claim 28 wherein the computer-readable medium is a computer-readable disk.

32. The computer-readable medium of claim 28 wherein the computer-readable medium is a data transmission medium transmitting a generated data signal containing the contents.

33. The computer-readable medium of claim 28 wherein the computer-readable medium is a memory of a computer system.

34. The computer-readable medium of claim 28 wherein the computer-readable medium is an Internet connection link to a voting authority server computer.

35. In a cryptographic method, a transmitted signal for use by a computer, comprising:
 a shuffled sequence of electronic data elements representing individual data files, wherein a one-way cryptographic transformation using at least a first secret key anonymously permuted an input sequence of electronic data elements to produce the shuffled sequence of electronic data elements, and
 a proof of correctness for the shuffled sequence of electronic data elements based on a scaled iterated logarithmic multiplication proof.

* * * * *